(12) United States Patent
Nakamura et al.

(10) Patent No.: US 7,655,889 B2
(45) Date of Patent: Feb. 2, 2010

(54) DISPLAY DEVICE AND CONTROL METHOD THEREFOR

(75) Inventors: Takashi Nakamura, Saitama (JP); Hirotaka Hayashi, Fukaya (JP); Norio Tada, Kumagaya (JP); Hiroki Nakamura, Ageo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 69 days.

(21) Appl. No.: 11/752,453

(22) Filed: May 23, 2007

(65) Prior Publication Data

US 2008/0001070 A1 Jan. 3, 2008

(30) Foreign Application Priority Data

May 24, 2006 (JP) ............................. 2006-144338
Jul. 24, 2006 (JP) ............................. 2006-200420

(51) Int. Cl.
*H05B 33/00* (2006.01)

(52) U.S. Cl. ............................. 250/205; 345/48; 345/77

(58) Field of Classification Search ................. 250/205; 345/48.77, 84, 207; 313/504, 506
See application file for complete search history.

(56) References Cited

U.S. PATENT DOCUMENTS 6,136,360 A * 10/2000 Tsuchida et al. ............ 426/500
7,218,048 B2 * 5/2007 Choi et al. .................. 313/504
2005/0082968 A1 * 4/2005 Choi et al. .................. 313/506

* cited by examiner

*Primary Examiner*—Georgia Y Epps
*Assistant Examiner*—Tony Ko
(74) *Attorney, Agent, or Firm*—Oblon, Spivak, McClelland, Maier & Neustadt, L.L.P.

(57) ABSTRACT

A display device has a predetermined display region and includes an array substrate equipped with a drive circuit, and a light sensor for measuring outside illuminance and a temperature sensor both installed on the array substrate. A control method for the display device includes using the light sensor to measure outside illuminance and using an output of the temperature sensor to correct an output of the light sensor, thereby adjusting luminance in the display region. The display device may further include an opposed substrate in opposition to the array substrate, a liquid crystal layer sandwiched between the two substrates to form the predetermined display region, and a backlight, thereby constituting a liquid crystal display device. Another configuration of a display device has a predetermined display region and includes an array substrate equipped with a drive circuit for display, and a light sensor installed on the array substrate for measuring outside illuminance, a filtering circuit for filtering a signal output from the light sensor and a processing circuit for processing the signal output from the light sensor and then filtered with the filtering means.

10 Claims, 17 Drawing Sheets

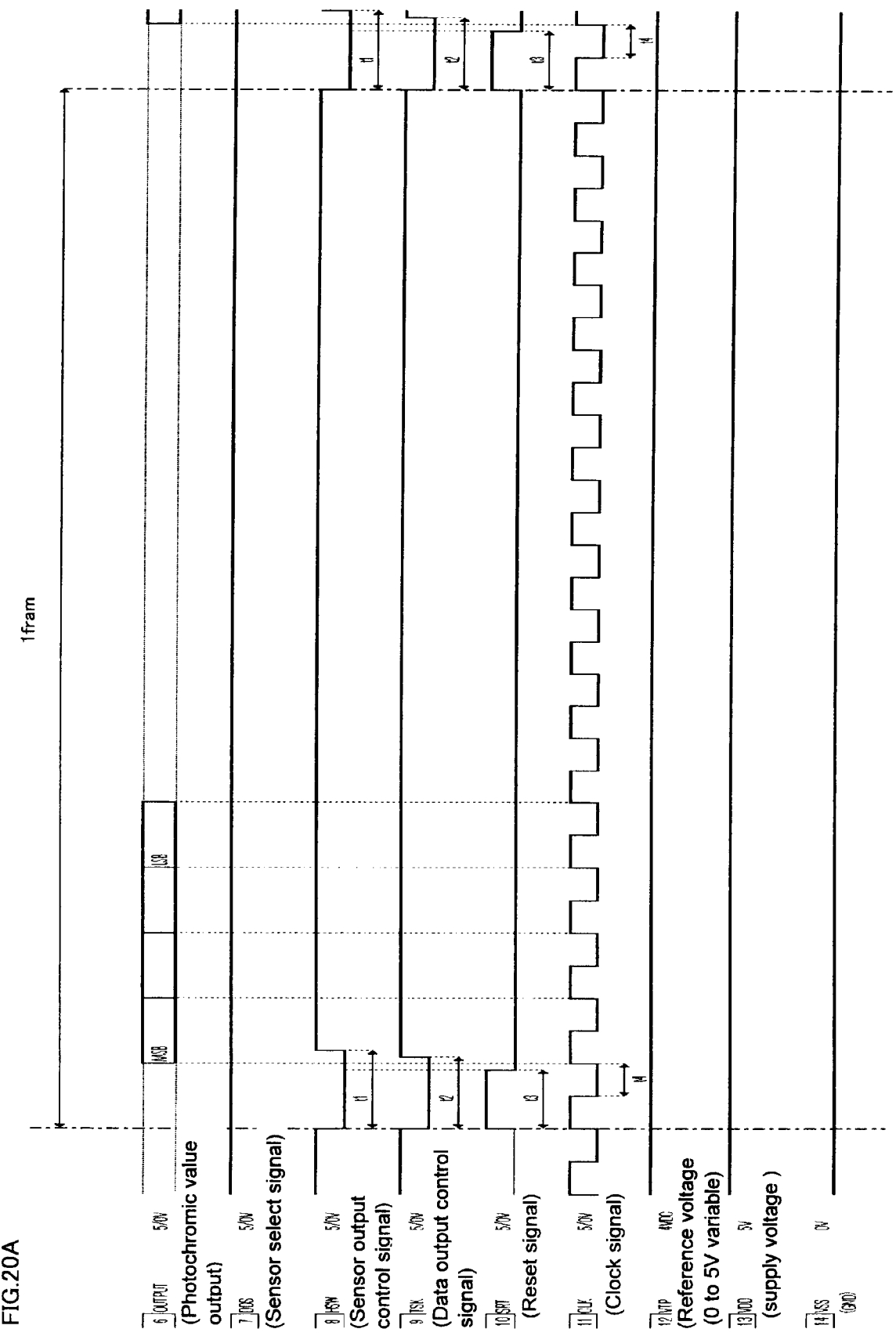

FIG.20B

|  | typ |  |
|---|---|---|
| Output data bit count | 4 | bit |
| Frame frequency | 62.5 | Hz |
| Frame cycle | 16 | ms |
| Count | 16 | CLK |
| Cycle (per clock) | 1000 | μs |
| Clock frequency | 1 | kHz |
| t1 HSW "L" width | 1002 | μs |
| t2 TSK "L" width | 1000 | μs |
| t3 SRT "H" width | 998 | μs |
| t4 CLK "L" width | 500 | μs |

DISPLAY DEVICE AND CONTROL METHOD THEREFOR

BACKGROUND OF THE INVENTION

1. Field of the Invention

The present invention relates to a display device, such as a liquid crystal display device, and to a control method therefor and particularly to an improvement in a display device equipped with a light sensor for monitoring outside illuminance.

2. Description of the Related Art

As display devices for information equipment including personal computers and word processors and for image equipment including television sets, camcorders and car navigation systems, liquid crystal display devices having features of lightweight, small thickness and low power consumption have widely been used. In the liquid crystal display devices, in order to realize a bright display screen, major devices adopt a configuration having a built-in backlight irradiating illuminating light from behind a display element.

One of the merits the liquid crystal display devices have is the property of low power consumption. Generally, electric power consumed by a backlight is greater than that consumed by a liquid crystal display panel. On the other hand, in the liquid crystal display devices, it is ordinarily necessary to heighten the display luminance as much as possible in order to sufficiently acquire visual discernibility and correspondingly thereto, when the backlight is set brightly, the property of low power consumption will possibly be diminished.

In view of the above, studies have been made on adjusting the brightness of a backlight in accordance with the environmental illuminance (outside illuminance) to suppress the power consumption as much as possible. The luminance required for acquiring sufficient visual discernibility in the case of low environmental illuminance as at night differs from that in the case of high environmental illuminance as out of doors in the fine daylight. It is conceivable that the illuminance of the backlight is adjusted to requisite minimum in accordance with the above difference, thereby enabling suppression of power consumption.

In order to realize the above, it has been proposed that in a liquid crystal display device, a light sensor (photosensor) is disposed outside the display region of a substrate and the output thereof is utilized to adjust the brightness of a backlight (refer, for example, to Japanese Patent No. 3015400, JP-A HEI 4-174819 and JP-A HEI 9-146073).

Japanese Patent No. 3015400 discloses a liquid crystal display device comprising first and second substrates, a liquid crystal layer sandwiched between the first and second substrates, a liquid crystal display panel having first and second photo acceptance units formed at the periphery of at least one of the first and second substrates, a backlight installed adjacently to the liquid crystal display panel, wherein the first photo acceptance unit detects the surrounding outside light and the second photo acceptance unit detects the light from the backlight, and means for adjusting the amount of light output from the backlight based on the results of detection by the first and second photo acceptance units.

JP-A HEI4-174819 discloses a liquid crystal display device comprising a liquid crystal display panel, a backlight for irradiating light from the back surface of the liquid crystal display panel, a controller for adjusting the amount of light from the backlight and a photodetector disposed abeam of the liquid crystal display panel, wherein the photodetector detects the surrounding brightness on the front surface of the liquid crystal display panel and the controller is adjusted to adjust the amount of light from the backlight.

JP-A HEI9-146073 discloses a backlight light-adjusting circuit for supplying luminance adjustment voltage to a backlight drive circuit of a liquid crystal display device having a backlight, comprising plural light sensors that detect the surrounding brightness on the front surface of a liquid crystal display panel and output outside illuminance signals, average value calculating means that calculates the average value of all or part of the outside illuminance signals output from these light sensors and luminance adjusting means that adjusts the luminance of the backlight drive circuit based on the average value of the outside illuminance calculated by the average value calculating means and the amount of the adjusted light set manually.

According to each of the related art references, it is made possible to adjust the display luminance in accordance with the outside illuminance and suppress the power consumption of mobile telephones or Personal Digital Assistants (PDAs). In each of the related art references, however, a configuration having a discrete light-adjusting sensor is installed independently of the liquid crystal display panel. This is contrary to the demands of the miniaturization and small thickness of liquid crystal display devices. Particularly, in the mobile telephones and PDAs, these demands are made severe. Thus, the prevention of the miniaturization and small thickness poses a serious problem.

It is conceivable that in order to solve the above problem a light sensor is integrally formed with one of the substrates (array substrate, for example) of a liquid crystal display panel using a low-temperature polysilicon technique, for example. However, the light sensor having been integrally formed with the array substrate using the low-temperature polysilicon technique has a problem that its characteristics vary depending on the surrounding temperature. Electric current flowing the light sensor includes a thermocurrent increasing or decreasing depending on the temperature besides a photocurrent proportional to incident light. For this reason, even when an output corresponding to 500 lx is obtained from the light sensor, it is difficult to adequately distinguish whether the output obtained is in fact 500 lx or the result that a great amount of photocurrents have flowed due to high temperatures in spite of 300 lx. Thus, a problem is posed in that light-adjusting performance fluctuates depending on the surrounding temperature.

The related art references do not sufficiently take measures to meet the situation with respect to variation or instability of an output from the light sensor and have a problem of difficulty in accurate luminance adjustment.

Since an illuminator, such as a fluorescent, emits light at a prescribed frequency, it induces so-called flicker, and the illuminance thereof varies with time. Therefore, a light sensor possibly detects light brighter or darker than actually detected. The error in such detection poses a serious problem in adjusting the luminance and possibly poses a problem of the display luminance failing to comply with the actual surrounding brightness.

The present invention has been proposed in view of the conventional state of affairs. One object thereof is to provide a display device capable of coping with the demands of the miniaturization and small thickness thereof, accurately measuring the illuminance with no temperature-dependency and appropriately controlling the luminance (the amount of light of a backlight, for example). Another object of the present invention is to provide a display device capable of accurately grasping the outside illuminance even when the illuminance varies with time, for example.

SUMMARY OF THE INVENTION

To attain the above objects, the present invention provides as a first aspect thereof a display device having a predetermined display region and comprising an array substrate equipped with a drive circuit, and a plurality of light sensors for measuring outside illuminance and a temperature sensor both installed on the array substrate. A control method for the display device of the invention having the predetermined display region and the array substrate equipped with the drive circuit comprises the steps of using the plurality of light sensors installed on the array substrate to measure the outside illuminance and using an output of the temperature sensor to correct an output of the plurality of light sensors, thereby adjusting luminance in the display region.

In the display device according to the first aspect of the invention, the plurality of light sensors is used to measure the outside illuminance. In this case, it is advantageous from the points of miniaturization and small thickness that the low-temperature polysilicon technique is used to form a first light sensor, for example, integrally on the array substrate. However, the output from the plurality of light sensors integrally formed by the low-temperature polysilicon technique contains a thermocurrent increasing or decreasing depending on the temperature. Only with the light sensor, therefore, it is difficult to accurately grasp the outside illuminance.

In view of the above, in the display device according to the first aspect of the invention, besides the plurality of light sensors, the temperature sensor for measuring the temperature surrounding the plurality of light sensors is installed to correct a value measured by the plurality of light sensors based on an output from the temperature sensor. What is measured with the temperature sensor is the thermocurrent increasing or decreasing depending on the temperature. By deducting the thermocurrent obtained from the output from the temperature sensor from the output from the plurality of light sensors, therefore, an output only from the outside illuminance can be obtained to accurately measure the outside illuminance.

The present invention further provides as a second aspect thereof a display device having a predetermined display region and comprising an array substrate equipped with a drive circuit for display, a plurality of light sensors installed on the array substrate for measuring outside illuminance, filtering means for filtering a signal output from the plurality of light sensors and a signal processing circuit, wherein the signal output from the plurality of light sensors is filtered with the filtering means and then supplied to the signal processing circuit.

In the display device according to the second aspect of the invention, the plurality of light sensors is used to measure the outside illuminance. In this case, it is advantageous from the points of miniaturization and small thickness that the low-temperature polysilicon technique is used to form a first light sensor, for example, integrally on the array substrate. However, when an illuminator etc. induces flicker, it is difficult to accurately grasp outside illuminance only in the presence of the flicker.

In view of the above, in the display device according to the second aspect of the invention, the filtering means is interposed between the plurality of light sensors and the signal processing circuit for processing the signal output from the plurality of light sensors. By means of the filtering means, the signal output from the plurality of light sensors is averaged. As a result, the signal is stably output even when an illuminator etc. induces flicker to enable accurate illuminance to be calculated with the signal processing circuit.

According to the first aspect of the invention, it is made possible to provide a display device small in size, thin in thickness and capable of accurate computation of illuminance. Therefore, it is made possible to appropriately control luminance with appropriate adjustment of a backlight, for example, and to materialize a display device excellent in visual discernibility in any of environments and low in power consumption.

According to the second aspect of the invention, it is made possible to provide a display device capable of accurately computing illuminance even when an illuminator induces flicker. Therefore, it is made possible to provide a display device capable of appropriately controlling luminance with appropriate adjustment of a backlight, for example, excellent in visual discernibility in any of environments and low in power consumption.

The above and other objects, characteristic features and advantages of the present invention will become apparent to those skilled in the art from the description to be given herein below with reference to the accompanying drawings.

BRIEF DESCRIPTION OF THE DRAWINGS

FIG. 20A is a diagram concretely showing drive timings in the circuit in FIG. 19 and FIG. 20B is a table showing the drive condition of FIG. 20A.

DETAILED DESCRIPTION OF THE PREFERRED EMBODIMENTS

Display devices (here, liquid crystal display devices) to which the present invention is applied will be described hereinafter with reference to the accompanying drawings.

The first embodiment of the present invention to which the first aspect of the invention is applied will be described. To be specific, the liquid crystal display device of the present embodiment has a plurality of light sensors and a temperature sensor for measuring the surrounding temperature of the plurality of light sensors installed thereon and intends to correct the value measured by the plurality of light sensors based on the output from the temperature sensor.

Figure 1:
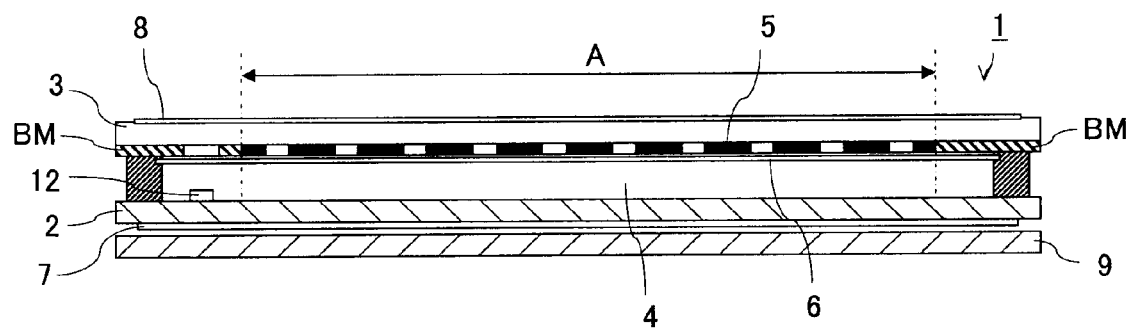
FIG. 1 is a pattern diagram showing the schematic cross section of one example of a liquid crystal display device according to the present invention.

FIG. 1 shows one example of a liquid crystal display device 1. In the liquid crystal display device 1, paired transparent insulation substrates constitute a liquid cell, and a liquid crystal material is sealed in the gap between the substrates to form a liquid crystal layer. Specifically, a liquid crystal layer 4 is sealed between an array substrate 2 and an opposed substrate 3.

The array substrate 2 comprises a transparent insulation substrate of glass, for example, as a support substrate, scan lines equidistantly disposed in parallel to one another on the transparent insulation substrate, signal lines disposed to be substantially orthogonal to the scan lines, interlayer insulation films (transparent insulation films) intervening between the scan lines and the signal lines to electrically insulate these and Thin Film Transistors (TFTs) disposed in the vicinity of the intersections between the scan lines and the signal lines for serving as switching elements.

Also, in the array substrate 2, a pixel electrode electrically connected to the switching elements via through holes formed in the interlayer insulation films is disposed and formed in a matrix shape. Incidentally, though the signal lines, scan lines, switching elements, such as TFTs, interlayer insulation films, etc. are disposed between the transparent insulation substrate of the array substrate 2 and the pixel electrode, as described above, these are omitted from FIG. 1. In addition, though an orientation film is disposed over the entire surface on which the pixel electrode is disposed, it is also omitted here from FIG. 1.

On the other hand, the opposed substrate 3 comprises a transparent insulation substrate of glass, for example, as a support substrate, color filter layers 5 formed on the surface of the transparent insulation substrate directed to the crystal layer 4 in correspondence to pixels and a transparent opposed electrode 6 of transparent conducting material, such as Indium Tin Oxide (ITO), formed over the entire surface of the color filter layers so as to cover the entire surface. The color filter layers 5 are resin layers colored with pigments or dyes and are constituted by a combination of filter layers of R, G and B colors, for example. In addition, at the interface portion (not shown) of the each color filter layer with a pixel, a so-called Black Matrix (BM) layer is formed with the aim of enhancing color contrast.

In the liquid crystal display device 1 having the configuration as described above, the array substrate 2 and opposed substrate 3 are provided on the outer sides thereof with polarization plates 7 and 8, respectively, and an image is displayed, with a backlight 9 disposed on the backside of the liquid crystal display device 1 as a light source.

Figure 2:
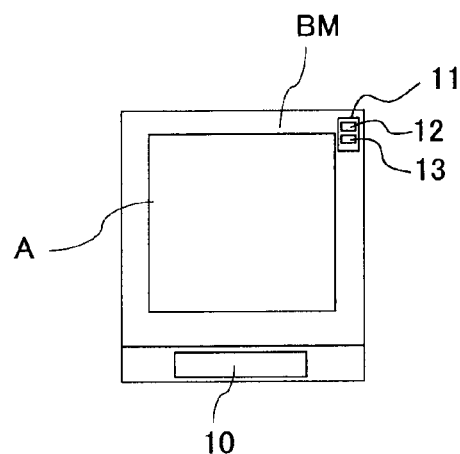
FIG. 2 is a pattern diagram showing the schematic plane of one example of a liquid crystal display device according to the first embodiment of the present invention.

FIG. 2 is a pattern diagram showing the plane of the liquid crystal display device 1. A black matrix BM is formed in the shape of a frame outside a display area A that is an active area on which an image is displayed, and configured so that light from the backlight 9 may not induce leakage. Outside region in which the black matrix BM is formed an external LSI 10 is mounted on the array substrate 2 with a Chip On Glass (COG).

While the fundamental configuration of the liquid crystal display device 1 is as described above, in the liquid crystal display device 1 according to the present embodiment, an opening 11 is formed in the black matrix BM disposed outside the display area A. A light sensor 12 for measuring the outside illuminance is installed on the array substrate 2 so as to face the opening 11. A temperature sensor 13 for measuring the temperature around the light sensor 12 is further installed on the array substrate 2 in the vicinity of the light sensor 12.

Figure 3:
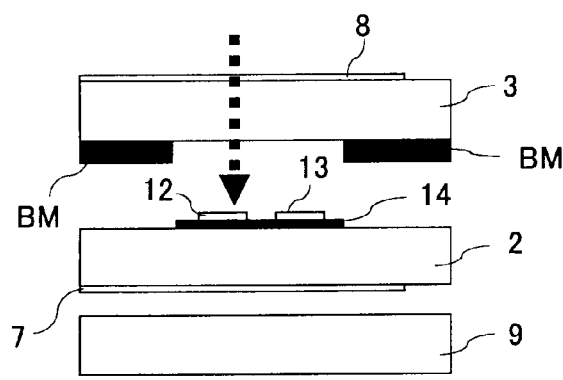
FIG. 3 is an enlarged cross section schematically showing the portion on which a light sensor and a temperature sensor are installed.

FIG. 3 shows the state in which the light sensor 12 and temperature sensor 13 are installed. The light sensor 12 is disposed as described above in opposition to the portion free from the black matrix BM (opening 11), and the outside light enters the liquid crystal device 1 via the opening 11 and is incident upon the light sensor 12 for measuring the outside illuminance. A light-shielding layer 14 is disposed on the bottom of the light sensor 12 for preventing the light of the backlight 9 from directly irradiating the light sensor 12.

The temperature sensor 13 is disposed in the vicinity of the light sensor 12 under the same circumstances as the light sensor. As a result, the temperature of the temperature sensor 13 is substantially the same as that of the light sensor, thereby making it possible to compensate for the temperature of the light sensor 12.

Both the light sensor 12 and the temperature sensor 13 are integrally formed on the array substrate 2 by the low-temperature polysilicon technique, for example, similarly to and simultaneously with the TFTs on the array substrate 2.

Figure 4A:
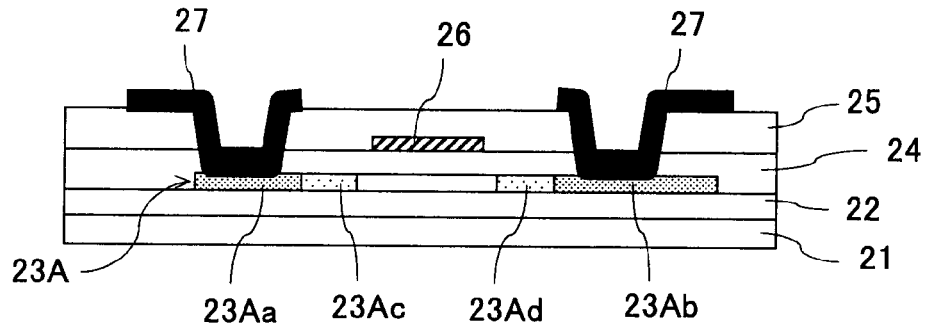
FIG. 4A is a schematic cross section showing an n-channel TFT.
Figure 4B:
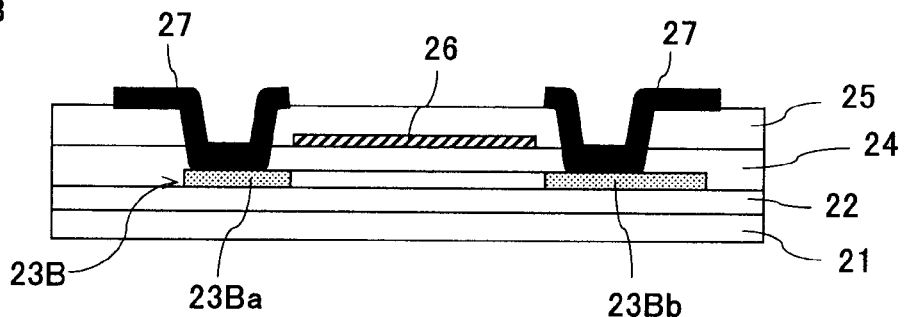
FIG. 4B is a schematic cross section showing a p-channel TFT.
Figure 4C:
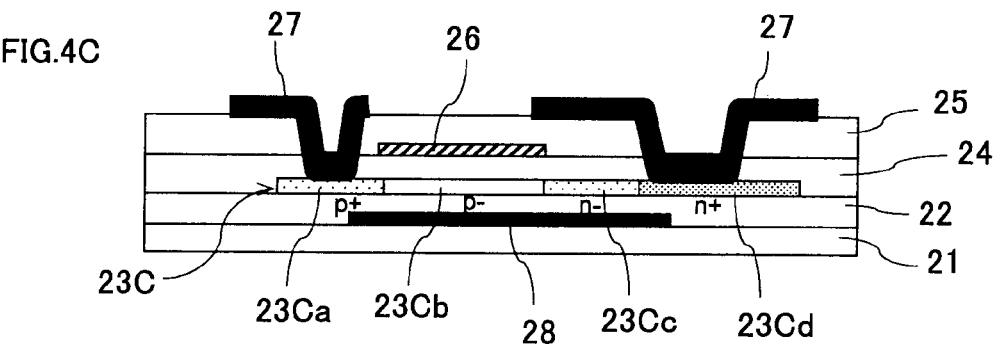
FIG. 4C is a schematic cross section showing a p-intrinsic-n (PIN) diode (light sensor).

FIG. 4A to 4C show one example of TFT and light sensor formed on the array substrate 2, FIG. 4A is showing the configuration of an n-channel TFT; FIG. 4B is showing the configuration of a p-channel TFT; and FIG. 4C is showing a PIN diode used as a light sensor.

Each of TFTs (an n-channel TFT and p-channel TFT), as shown in FIG. 4A and FIG. 4B, comprises a substrate 21 and a polycrystalline semiconductor layer (polysilicon layer) 23A or 23B formed via an undercoat layer 22 on the substrate 21 to utilize the polycrystalline semiconductor layer as a channel layer.

The undercoat layer 22 is formed on the substrate 21 for the purpose of stop up flaws and pits on the surface of the substrate 21 to planarize the substrate surface and preventing impurities contained in the substrate 21 from being diffused into the polycrystalline semiconductor layers 23A and 23B. The undercoat layer 22 is a layer formed from silicon oxide film or silicon nitride film and may have a stacked structure consisting of a planarization layer of fluidization resin fluidized by heat treatment and a coating layer preventing diffusion of impurities, for example. When the substrate 21 is excellent in surface planarization and contains few impurities, the undercoat layer 22 may be omitted.

The polycrystalline semiconductor layer 23A or 23B formed on the undercoat layer 22 is formed by a method comprising annealing an amorphous silicon (a-Si) formed by the plasma Chemical Vapor Deposition (CVD) method, for example, and polycrystallizing the annealed a-Si using laser irradiation. Each of the polycrystalline semiconductor layers 23A and 23B is isolated by etching into islands elements that are arrayed in the form of a matrix.

The polycrystalline semiconductor layer 23A corresponds to an n-channel TFT, and the polycrystalline semiconductor layer 23B to a p-channel TFT. Therefore, the polycrystalline semiconductor layers 23A and 23B are formed by impurity implantation respectively with source regions 23Aa and 23Ba and drain regions 23Ab and 23Bb. The n-channel TFT is further provided with Lightly-Doped-Drain (LDD) regions 23Ac and 23Ad.

Also, in each of the TFTs, a first metal (gate electrode) and a second metal are formed on each of the polycrystalline semiconductor layers 23A and 23B via a first insulation layer 24 and a second insulation layer 25.

On the other hand, in the PIN diode, as shown in FIG. 4C, a light-shielding pattern 28 is formed on the substrate 21 using a metal material (Mo—W alloy, for example), connected via a through hole (not shown) to a power line (not shown) and set to have a specific potential (a ground (GND) level, for example) at least at a sensor portion. Also in the PIN diode, the device (PIN diode) formed on the substrate 21 is provided with the light-shielding pattern 28 and, similarly to the aforementioned TFTs, with the undercoat layer 22 formed of $SiN_x$, $SiO_x$, etc.

Incidentally, the light-shielding layer 28 does not need to be provided on the lower surface of each TFT. In this case, the TFT is at an advantage that the open area ratio is enhanced. A TFT provided with the light-shielding layer 28 is at an advantage that the off-leakage current thereof can be reduced, thereby improving the contrast ratio to enhance the image quality.

On the undercoat layer 22, is formed a polycrystalline semiconductor layer 23C, similarly to the TFTs, simultaneously with the polycrystalline semiconductor layers 23A and 23B, and has a $p^+$ region 23Ca, a $p^-$ region 23Cb, an $n^-$ region 23Cc and an $n^+$ region 23Cd. By disposing the four regions in the lateral direction in this way, a diode is constituted. By setting the $p^+$ side to be the GND (0 V) and the $n^+$ side to be 5 V, the photocurrent corresponding to the intensity of light irradiated flows to the opposite sides of the diode.

The PIN diode may have a configuration excluding the $n^-$ region 23Cc. Unlike the PIN diode having the four regions disposed in the lateral direction as shown in FIG. 4C, the PIN diode may have a configuration having the four regions disposed in vertical direction. In the PIN diode, each of a first metal 26 and a second metal 27 is formed on the polycrystalline semiconductor layer 23C via a first insulation layer 24 and a second insulation layer 25, similarly to the TFTs.

Figure 5:
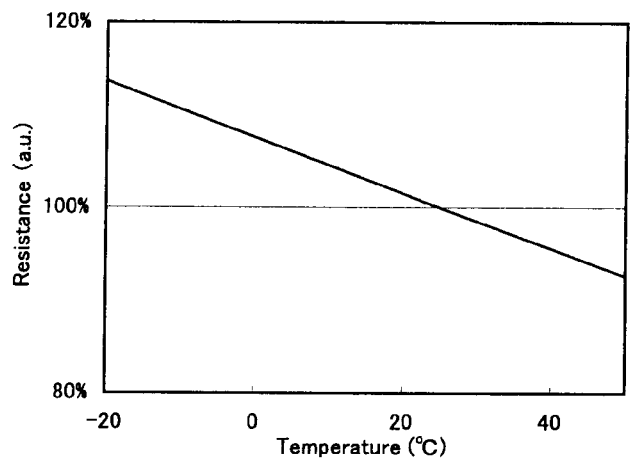
FIG. 5 is a characteristic graph showing the temperature dependency of the resistance value of polysilicon.

On the other hand, the temperature sensor 13 has a resistor element produced using polysilicon, for example, as a temperature-sensitive element. The resistance of polysilicon has temperature dependency and, as shown in FIG. 5, is prone to decreasing in proportion as the temperature increases, and vice versa. This characteristic feature is utilized for the temperature sensor 13.

Figure 6A:
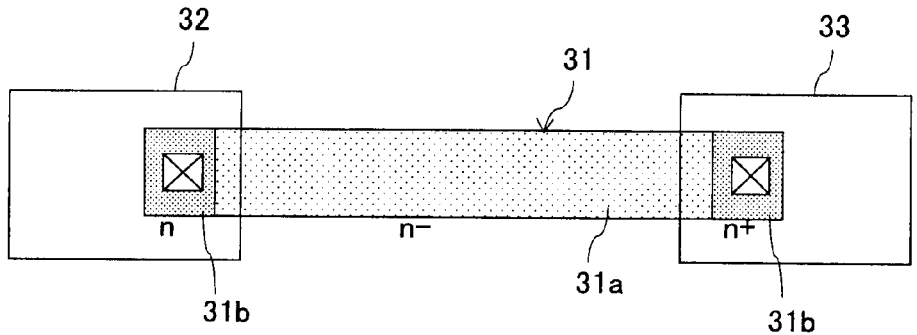
FIG. 6A is a schematic plan view showing one example of the configuration of a resistor element and FIG. 6B is a schematic cross section thereof.
Figure 6B:
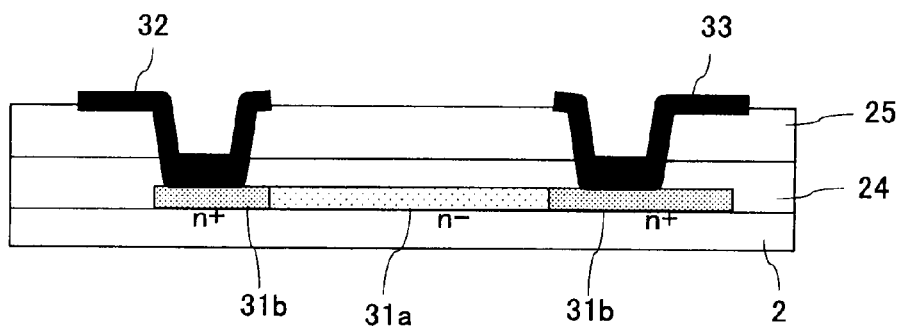

It is sufficient for the resistor element to have a configuration, as shown in FIG. 6A and FIG. 6B, in which a resistive element 31 is provided on the opposite ends thereof with electrodes 32 and 33, respectively. A conceivable method of simultaneous formation of the resistor element and the light sensor (PIN diode) comprises forming the resistive element 31 on the array substrate 2, forming the first and second insulation layers 24 and 25, forming openings in the first and second insulation layers 24 and 25 and forming the electrodes 32 and 33.

In the resistor element having the configuration described above, the temperature dependency of the resistance of the resistive element 31 varies depending on the kind and concentration of the impurities implanted into the polysilicon. In this case, adoption of the kind and concentration of the impurities used for the n-channel and p-channel TFTs enables simultaneous formation of the resistive element (polysilicon) 31 implanted with the impurities during the course of forming these TFTs. In this case, the resistive element 31 is formed as any one of the $p^+$ region, $p^-$ region, $n^-$ region and $n^+$ region. Among other regions enumerated above, the $n^-$ region is preferred in view of the characteristic features etc. In the resistor element, a region 31a of the resistive element 31 functioning as the photosensitive region is set to be the $n^-$ region and the opposite ends 31b thereof the $n^+$ regions. By setting the opposite ends 31b of the resistive element connected to the electrodes 32 and 33 to be the $n^+$ regions, it is preferred that the resistance thereof is decreased as much as possible.

The light sensor (PIN diode) 12 and TFTs exhibit dependency on both light and heat, whereas the resistor element of the above configuration little exhibits dependency on light. That is to say, since the resistance of the resistor element is not so changed by light, the resistor element functions as a temperature sensor exhibiting heat dependency alone.

Figure 7:
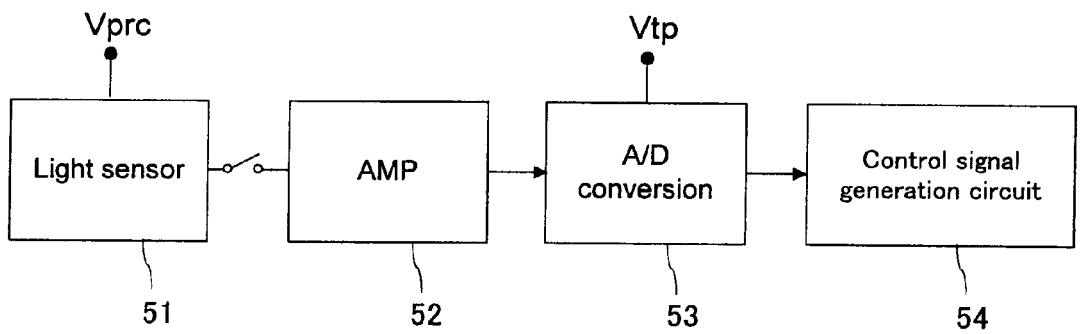
FIG. 7 is a circuit diagram showing one example of a light sensor circuit.

A method for the measurement of the outside illuminance in the liquid crystal display device 1 having the aforementioned configuration will be described. First, a circuit block diagram of a light sensor circuit is shown in FIG. 7. The array substrate 2 is provided thereon integrally with a pixel TFT for display, a gate line drive circuit, signal line drive circuit, light sensors 51, an amplifier (AMP) 52 and an A/D conversion circuit 53. The external LSI 10 is provided with an illuminance computation circuit and a control signal generation circuit 54 connected to the sensor circuit.

Figure 8:
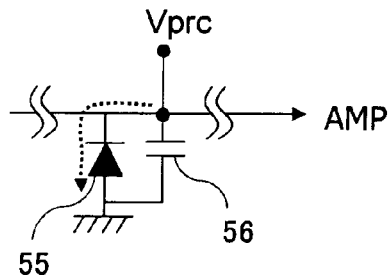
FIG. 8 is a circuit diagram of a light sensor.

FIG. 8 is a circuit diagram showing the light sensor circuit formed on the array substrate 2. The light sensor circuit is equipped with a photodiode (light sensor) 55 and a capacitor element 56. The capacitor element 56 is pre-charged with prescribed voltage Vprc at a prescribed timing, and a photocurrent corresponding to the outside illuminance flows through the photodiode 55.

Figure 9:
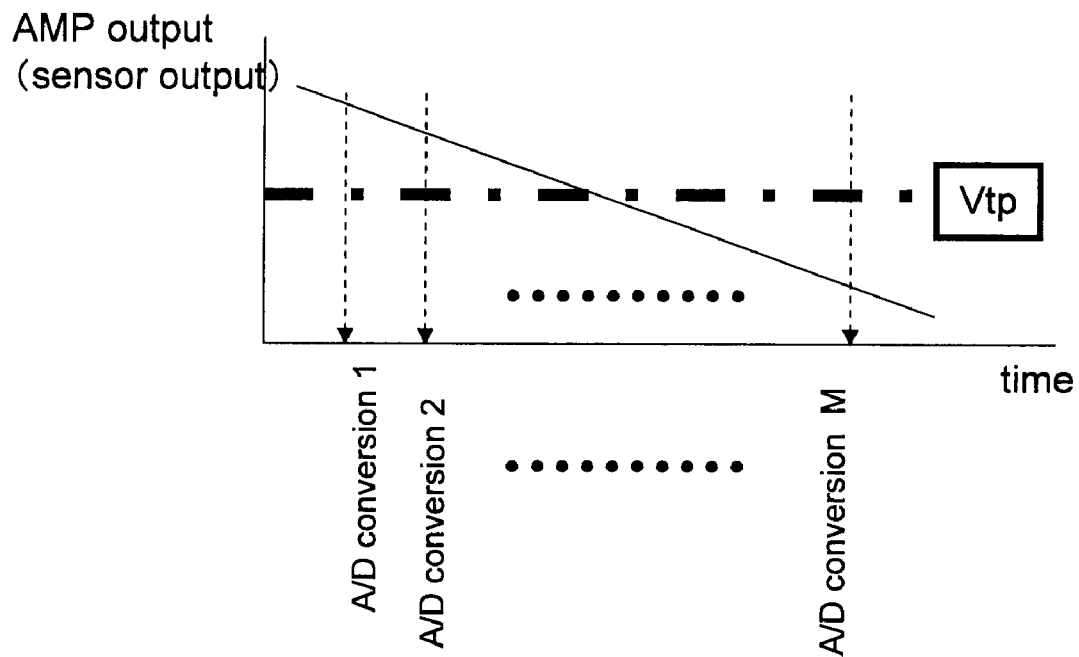
FIG. 9 is a diagram showing a variation in voltage of a capacitor element (amplifier output) in the light sensor with time.

FIG. 9 shows a variation in voltage of the capacitor element 56 with time. When the outside light is irradiated on the light sensor 12 for measuring the outside illuminance, an electric current flows through the photodiode 55 (light sensor 12 for measuring the outside illuminance), with the result that the voltage gradually decreases from the initial pre-charged voltage Vprc toward the GND voltage. This is converted at the prescribed timing into a digital signal with the A/D conversion circuit 53 formed on the array substrate 2. The digital signal is output to the external LSI 10 at the prescribed timing. It can be said that the outside illuminance is intense when an absolute value of the inclination in FIG. 8 is large and that when the absolute value is small, the outside illuminance is weak.

The A/D conversion circuit 53 is not particularly limited, but may be a type that compares the reference voltage Vtp given stepwise from an external IC, for example, with the voltage output from the sensor. An example of the A/D conversion circuit 53 is shown in FIG. 10.

Figure 10A:
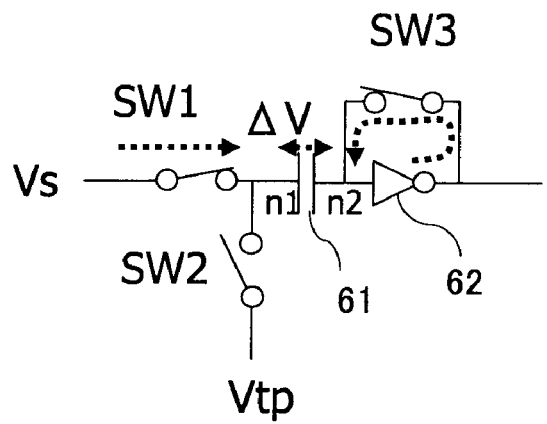
FIG. 10A is a circuit diagram showing one example of an A/D converter circuit where Vs<Vtp and FIG. 10B is that where Vs>Vtp.
Figure 10B:
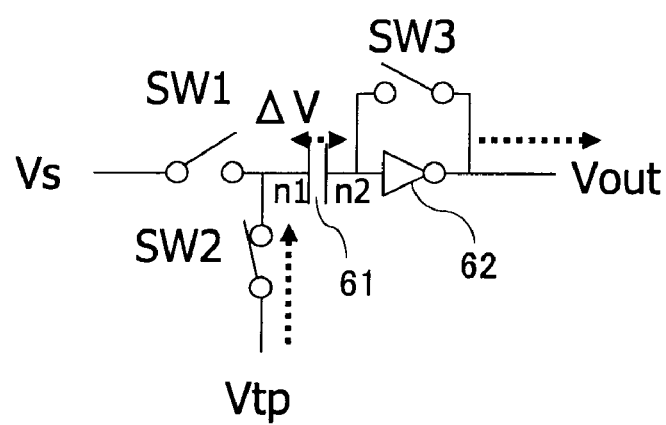

The A/D conversion circuit 53 comprises three switches SW1, SW2 and SW3, a capacitor element 61 and an inverter 62. As shown in FIG. 10A, when SW1=H and SW2=L, node n1 is charged with sensor output voltage Vs and node n2 with an inverter-operating threshold value. On the other hand, as shown in FIG. 10B, when SW1=L and SW2=H, an operation of comparison between the sensor output voltage Vs and the reference voltage Vtp is performed to obtain a theoretical output Vout varying on whether or not Vs is larger than Vtp. Every time the sensor output is sampled, the value of Vs can be obtained by stepwise varying the Vtp. It is noted that in proportion as the scaling of Vtp is minute, the precision is heightened.

In the light sensor circuit, the time the output of the A/D conversion circuit 53 is inverted (i.e. the time required for reducing the potential of the capacitor element 56 by $\Delta V$=2.5 V due to the voltage leakage) $\Delta T$ is measured. The current I flowing from the time $\Delta T$ through the photodiode 55 (light sensor 12 for measuring the outside illuminance) can be calculated as I=dQ/dt=C$\Delta$V/dt=C$\Delta$V/$\Delta$T. The pre-charged voltage Vprc is 5 V, for example, and the reference voltage Vtp is 2.5 V, for example.

Thus, the outside illuminance is calculated based on the output from the light sensor 12 for measuring the outside illuminance. Only with this, however, it is difficult to attain accurate measurement. This is because the light sensor 12 formed on the array substrate 2 for measuring the outside illuminance is affected by the thermocurrent increasing or decreasing depending on the temperature. In the liquid crystal display device 1 of the present embodiment, therefore, the temperature sensor 13 is provided besides the light sensor 12, and the output of the temperature sensor is utilized to remove the thermocurrent having the temperature dependency in the light sensor 12, thereby eliminating the influence by the thermocurrent.

Figure 11:
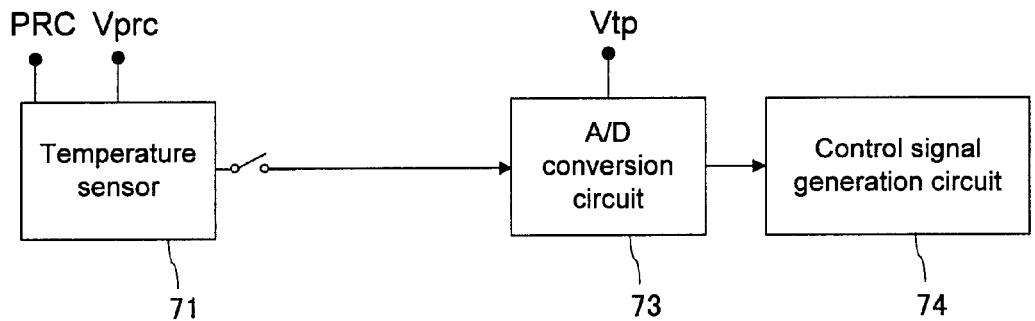
FIG. 11 is a circuit diagram showing one example of a temperature sensor circuit.

A temperature sensor circuit, similarly to the light sensor circuit, comprises a light sensor circuit 71, an A/D conversion circuit 73 and a control signal generation circuit 74, as shown in FIG. 11. The configuration of the A/D conversion circuit 73 is similar to that of the A/D conversion circuit 53 of the light sensor.

Figure 12:
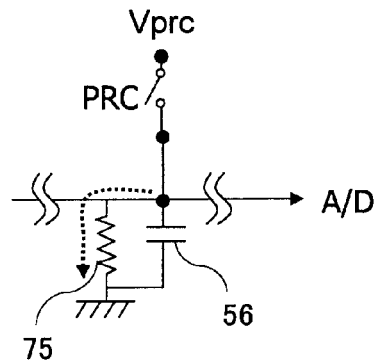
FIG. 12 is a circuit diagram of a temperature sensor.

FIG. 12 is a circuit diagram showing the temperature sensor circuit formed on the array substrate 2. The temperature sensor circuit is provided with a resistor element 75 and a capacitor element 76. The capacitor element 76 is pre-charged at a prescribed timing with a prescribed voltage Vprc, and an electric current flows through the resistor element 75 in an amount corresponding to a variation in resistance value by a change in temperature of the resistive element constituting the resistor element 75.

In the temperature sensor circuit, the time the output of the A/D conversion circuit 73 is inverted (i.e. the time required for reducing the potential of the capacitor element 76 by $\Delta V'$=2.5 V due to the voltage leakage) $\Delta T'$ is measured. The current I' flowing from the time $\Delta T'$ through the resistor element 75 can be calculated as I'=dQ'/dt=C$\Delta V'$/dt=C$\Delta V'$/$\Delta T'$. The pre-charged voltage Vprc is 5 V, for example, and the reference voltage Vtp is 2.5 V, for example.

In both the light sensor circuit and the temperature sensor circuit, the same circuit can be used for the A/D conversion circuits 53 and 73. It is also possible to make the pre-charging timings common to each other, thereby enabling the control signals to be in common with each other. Therefore, there is an advantage that an area of the frame portion of the display device into which these circuits are to be built can be made small.

A concrete procedure for correcting the temperature is taken as described below. Incidentally, the temperature correction or calibration is made in the external IC that may be disposed on the frame portion of the array substrate 2, for example.

Figure 13:
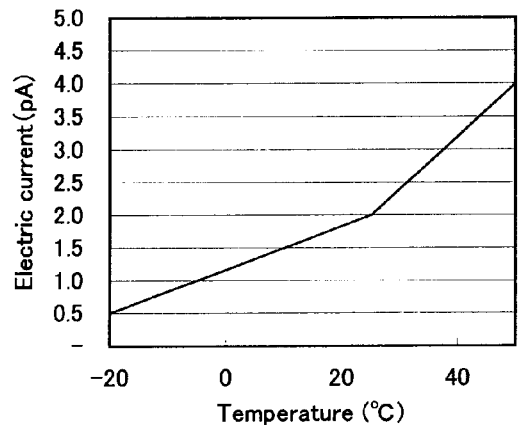
FIG. 13 is a characteristic diagram showing the temperature dependency of a current flowing through the light sensor.
Figure 14:
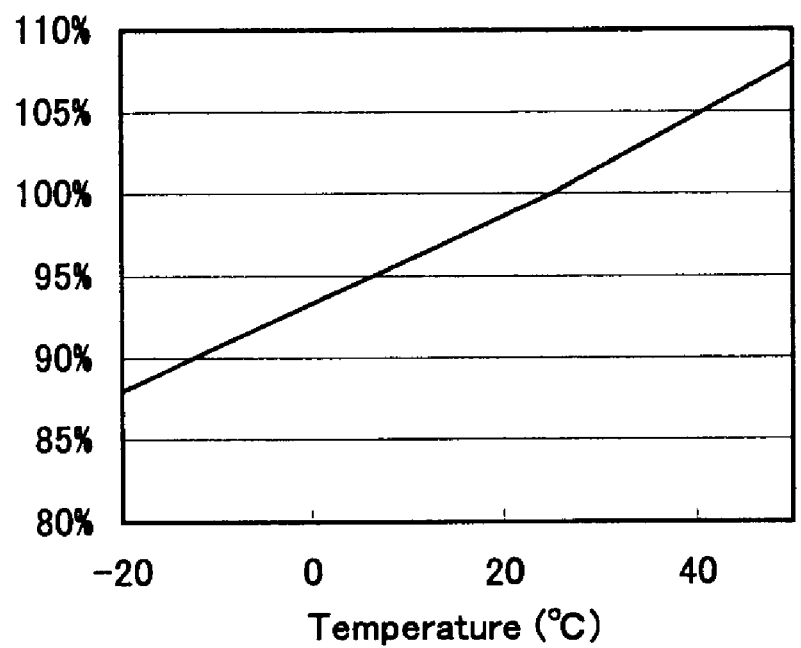
FIG. 14 is a characteristic diagram showing the temperature dependency of the resistance value (relative value) of the temperature sensor.

The electric current (photocurrent+thermocurrent) flowing through the light sensor 12 is set to be 5 pA under the conditions of 25° C. and 100 lx. As shown in FIG. 13, while the thermocurrent is 2 pA at 25° C., it is 4 pA, the twice the 2 pA, at 50° C. and 1 pA, the one-half the 2 pA, at −20° C. Since the thermocurrent between 25° C. and 50° C. and that between 25° C. and −20° C. approximate substantially to a straight line, no practical problem will be posed. With the resistance of 100% at 25° C. as the standard, the resistance is 108% at 50° C. and 88% at −20° C. Since the resistance between 25° C. and 50° C. and that between 25° C. and −20° C. approximate substantially to a straight line, no practical problem will be posed. Assuming that the current of the resistor element 75 receiving the output from the A/D conversion circuit 73 of the temperature sensor 71 in a prescribed time has exhibited a resistance of 104%, the temperature is calculated from the proportional calculation as 37.5° C. At this time, since it can be presumed that the thermocurrent of the light sensor 51 is 3 pA, 1.5 times the value at 25° C., by deducting the contributory shares of the thermocurrent of 3 pA from the output of the A/D conversion circuit of the light sensor 51, data for light adjustment having been deprived of the influence of the temperature characteristic can be acquired. While the correction for adjustment of the light sensor has been described in the foregoing, a correction of the operating point for an optical touch panel, for example, can be attained.

As described in the foregoing, in the liquid crystal display device 1, since the light sensor and temperature sensor are formed integrally on the array substrate 2, the demands for small size and small thickness can be satisfied and, moreover, calculation of accurate illuminance can be made. Furthermore, since the array substrate is provided thereon integrally with the temperature sensor and its signal conversion circuit and has a temperature correction function, even when the value of the photocurrent has changed from that at normal room temperature due to a change in the surrounding temperature, for example, it is made possible to appropriately correct the change based on the output from the temperature sensor. Therefore, it is possible to materialize a liquid crystal display device capable of appropriately adjusting the backlight, excellent in visual discernibility in all temperature environments and low in power consumption.

The second embodiment of the present invention to which the second aspect of the invention directed to a liquid crystal display device is applied will be described. To be specific, this embodiment takes measures to meet the situation with respect to the variation and instability of the output from a light sensor and has the same configuration as in the first embodiment like that shown in FIG. 1.

Figure 15:
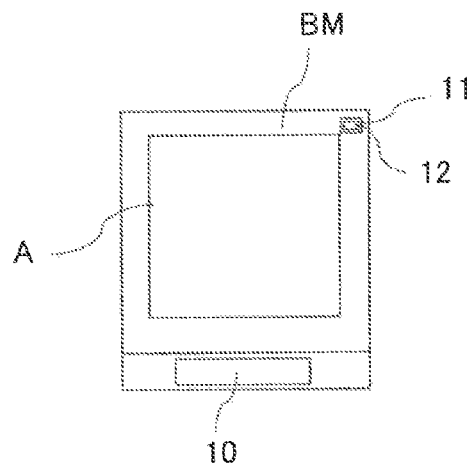
FIG. 15 is a pattern diagram showing the schematic plane of one example of a liquid crystal display device according to the second embodiment of the present invention.

While the liquid crystal display device in this embodiment is provided with the light sensor similarly to the first embodiment, it has no temperature sensor. In the liquid crystal display device 1 in this embodiment as shown in FIG. 15, a black matrix BM outside the display region A is formed with an opening 11, and a light sensor 12 for measuring outside illuminance is installed on an array substrate 2 so as to face the opening 11.

Figure 16:
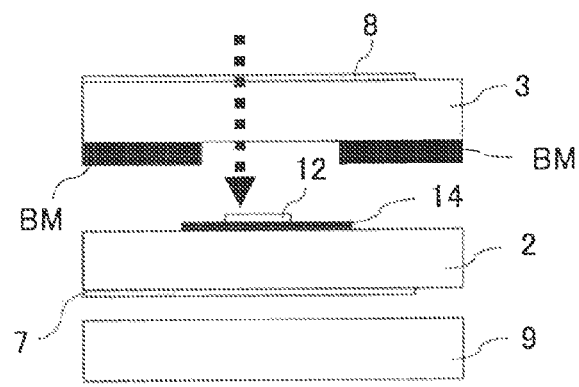
FIG. 16 is an enlarged cross section schematically showing the portion on which a light sensor and a temperature sensor are installed.

FIG. 16 shows the state in which the light sensor 12 for measuring the outside illuminance is installed. The light sensor 12 for measuring the outside illuminance, as described above, is disposed in opposition to the portion free from the black matrix BM of the opposed substrate 3 (opening 11), and the outside light enters the liquid crystal device 1 via the opening 11 and is incident on the light sensor 12. On the lower surface of the light sensor 12 is provided a light-shielding layer 14 for the purpose of eliminating direct application of the light from the backlight 9 to the light sensor 12.

The TFT and light sensor (PIN diode) formed on the array substrate 2 in this embodiment have the same configurations as in the first embodiment shown in FIG. 4A to FIG. 4C. Furthermore, the method of measuring the outside illuminance in the liquid display device 1 of this embodiment is the same in fundamental principle as the method thereof described in the first embodiment with reference to FIG. 7 to FIG. 10.

The measurement method described above calculates the outside illuminance based on the output from the light sensor 12 for measuring the outside illuminance. Only with this, however, it is difficult to make an accurate measurement. For example, illuminance of a fluorescent induces flicker at a prescribed frequency. That is to say, the illuminance varies with time. Depending on the relationship with the exposure timing of the light sensor, it is sometimes felt that the illuminance is directed to brightness or darkness. In the present embodiment, therefore, this problem has been solved using a filtering circuit (filtering means) formed on a glass substrate.

Figure 17:
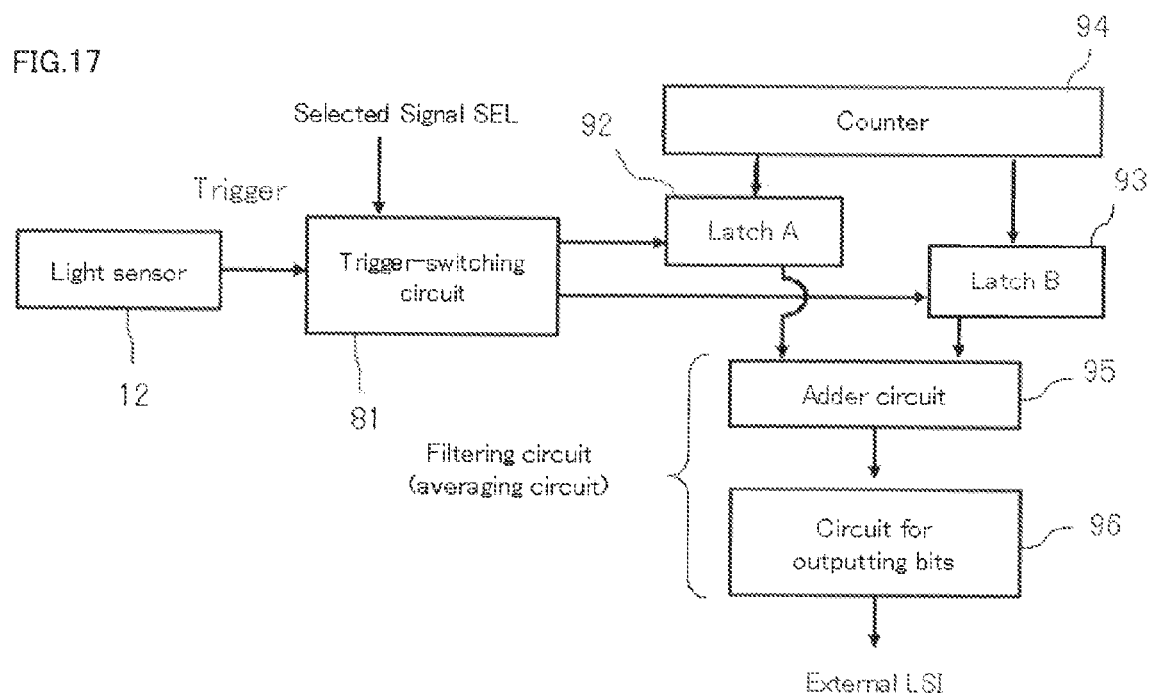
FIG. 17 is a diagram showing one example of the circuit configuration of filtering means.

FIG. 17 is a block diagram showing the filtering circuit. The filtering circuit comprises a trigger-switching circuit 81, a plurality of latch circuitries (latch A 82 and latch B 83), a counter 84, an adder circuit 85 and a circuit 86 for outputting significant bits. The latch A 82 and latch B 83 latch counter values when trigger signals have been input, respectively. Here, two latch circuitries are adopted. However, more than two latch circuitries may be adopted. The adder circuit 85 adds to latch values over a plurality of times. The circuit 86 outputs significant bits to enable averaging the latch values over a plurality of times. Therefore, the adder circuit 85 and the circuit 86 for outputting significant bits constitute the filtering circuit (averaging circuit).

When measuring the outside illuminance, one sensor exposure is performed during the term of one frame. An selected signal SEL is given to the trigger-switching circuit 81 that, based on the elected signal, switches supply of a trigger signal from the light sensor 12 to the latch A 82 or a latch B 83. To be specific, a counter value based on the trigger signal from the light sensor 12 is first stored in the latch A 82 and a counter value based on a subsequent trigger signal is then stored in the latch B 83. When an illuminator induces flicker, for example, different counter values are stored in the latch A 82 and latch B 83. When no flicker is induced, substantially the same counter value is stored in each of the latch A 82 and latch B 83.

The counter value (Ta) in the latch A 82 and the counter value (Tb) in the latch B 83 are added at the counter circuit 85 (Ta+Tb). The added value is sent to the circuit 86 for outputting significant bits excluding the least significant bit. That is to say, the circuit 86 outputs a value of (Ta+Tb)/2. By performing the filtering (averaging) in this way, an output can be made stable even when the illuminator induces flicker.

While the number of the frames sampled is 2 in the above configuration, it may be more. Making the number of the frames to be sampled more enables a more stable output to be obtained. When the number is unduly large, however, a problem on a delay of a response to light adjustment may possibly arise. In this case, a change in illuminance cannot immediately be discerned at the movement from a bright place to a dark place, but discerned slightly later. In view of this, when one exposure is performed during the term of one frame (16.7 msec), it is better to sample 16 frames. In this case, 16 latch circuitries (latch A, latch B, . . . latch P) are prepared.

While, in this embodiment, the filtering is performed using the circuit formed on the glass substrate (array substrate 2), it may be performed appropriately also on the side of the external LSI 10. Furthermore, the filtering is performed on the glass substrate over 16 frames and then the averaging may further be performed on the side of the external LSI 10.

In the display device according to the present embodiment having the aforementioned configuration, the illuminance can accurately be calculated even when the illuminator induces flicker. By adjusting the backlight properly based on the illuminance calculation, for example, it is made possible to appropriately control the luminance.

The third embodiment of the present invention will be described, which is directed, similarly to the second embodiment, to the countermeasure for coping with variation and instability in an output of the light sensor. In this embodiment, two light sensors are installed to adjust light based on the outputs from the two light sensors. While various cases are conceivable, there is a case where a light sensor 12 judges darkness when having projected the hand of a user on a light-receiving portion of the sensor 12 in spite of actual brightness. This problem can be solved by installing two (or more) light sensors 12A and 12B and taking a NOT-OR operation "NOR" out of the outputs from the sensors, thereby causing the sensors to correctly recognize the brightness.

Figure 18:
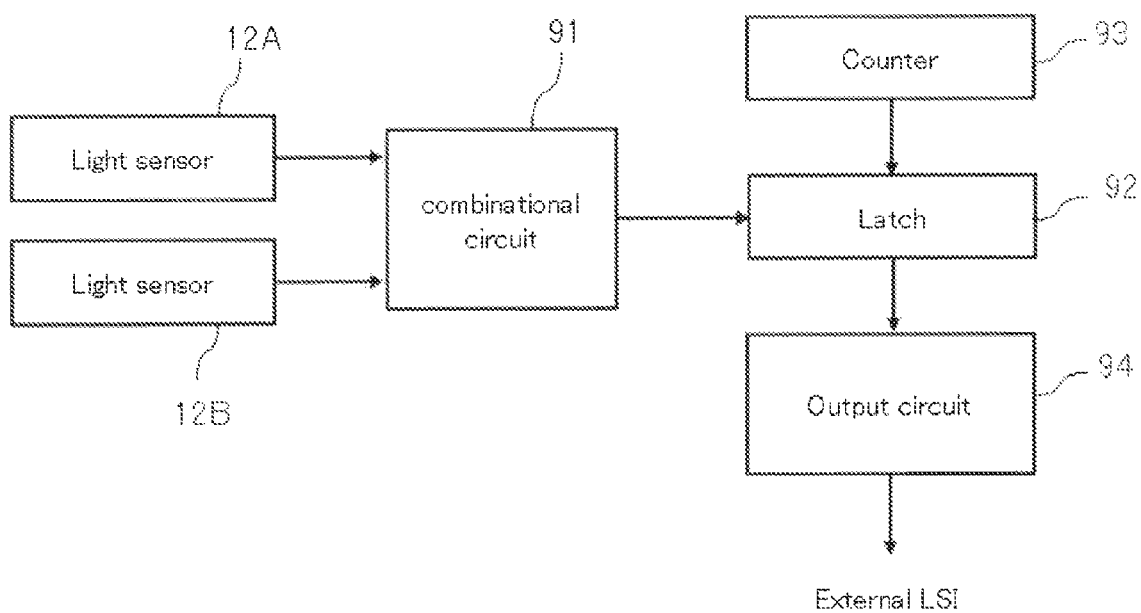
FIG. 18 is a block diagram showing a circuit having two light sensors.

FIG. 18 is a block diagram showing a circuit having two light sensors 12A and 12B installed on an array substrate 2. The outputs of the sensors are input to a combinational circuit 91. The outputs of the light sensors 12A and 12B are inverted at different times depending on the illuminance. The combinational circuit 91 issues a trigger signal relative to a latch circuit 92 when the outputs of the light sensors 12A and 12B have been inverted. The latch circuit 92 latches a counter value from a counter 93 when having received the trigger signal. The counter value is then transferred to an output circuit 94 that outputs data serially to an external LSI 10.

Figure 19:
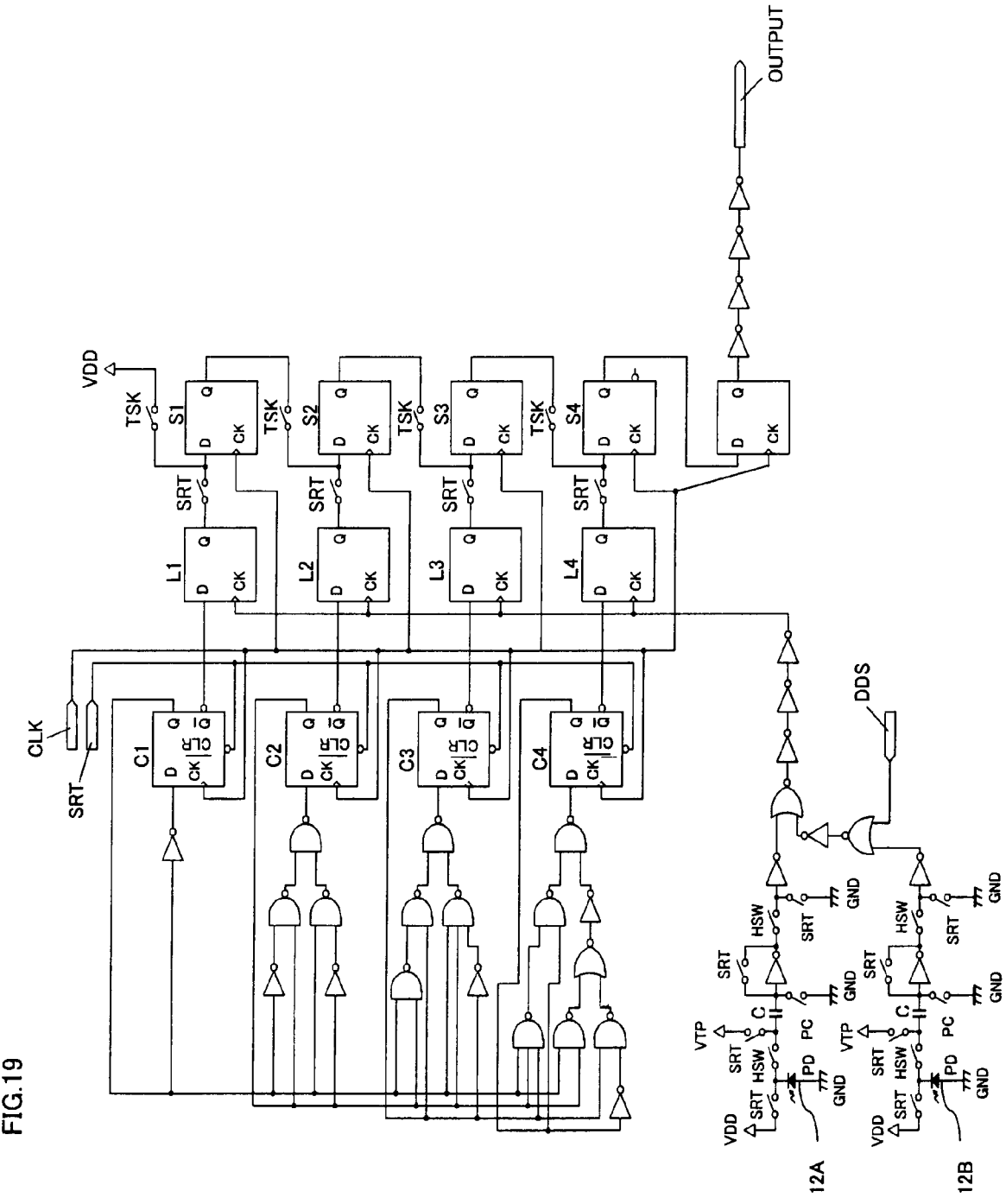
FIG. 19 is a detailed diagram of the circuit in FIG. 18.

FIG. 19 is a detailed view of the circuit shown in FIG. 18. As described above, the circuit has the two light sensors 12A and 12B that are connected to a comparator. Each of the light sensors 12A and 12B is charged with VDD (5 V) at a prescribed timing (when SRT becomes H). A capacitor of the comparator is also charged with the reference voltage Vtp at a prescribed timing (when SRT becomes H). After SRT is set to be L, VDD (5 V) leaks via the light sensor 12A or 12B depending on the outside illuminance to be decreased. The comparator outputs L to a NOR circuit when the outputs of the light sensors 12A and 12B have fallen short of the reference voltage Vtp (4 V). This change from H to L is used as the trigger signal.

C1 to C4 stand for 4-bit counter circuits that count CLK. Though, as the CLK, an exclusive clock may be used, a clock for a gate line drive circuit can be used. L1 to L4 stand for latch circuits that operate to store the counter value when the output of the NOR circuit has changed from H to L. S1 to S4 stand for shift register circuits that serially convert the 4-bit counter values latched with the latch circuits and output the converted values. SRT is set to be H to store each bit of the latch circuits in the shift register circuits S1 to S4 and then SRT becomes L to disconnect SRT from the latch circuits, thereby outputting pits one by one in order from the Most Significant Bit (MSB) in synchronization with the clock.

FIG. 20A and FIG. 20B show an example of drive timing in the circuit shown in FIG. 19 in which one light adjustment output is made during the term of one frame in the image display of a Liquid Crystal Display (LCD). Incidentally, latch circuits L1 to L4 may be added with a circuit to be reset immediately after SRT is started up. While the present embodiment adopts two light sensors, more than two light sensors may be adopted. In this case, a majority rule circuit can be used as the combinational circuit 91 in place of the NOR circuit.

Figure 21:
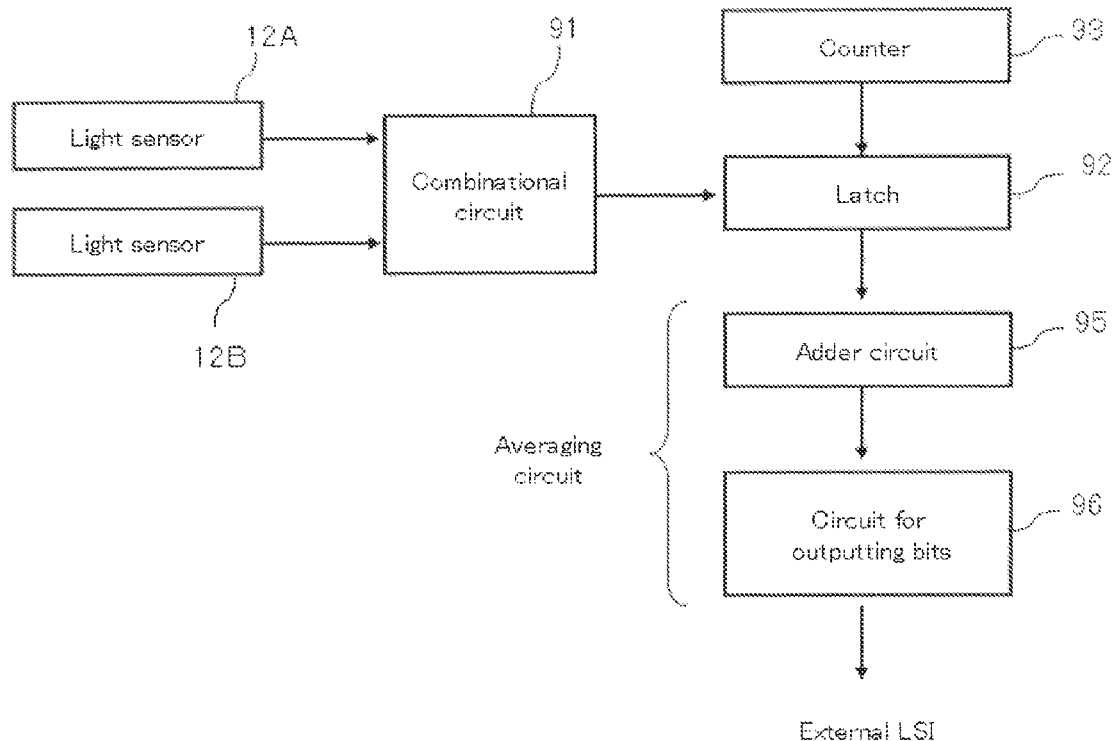
FIG. 21 is a diagram showing one example of the configuration of the circuit in FIG. 18 added with filtering means.
Figure 22:
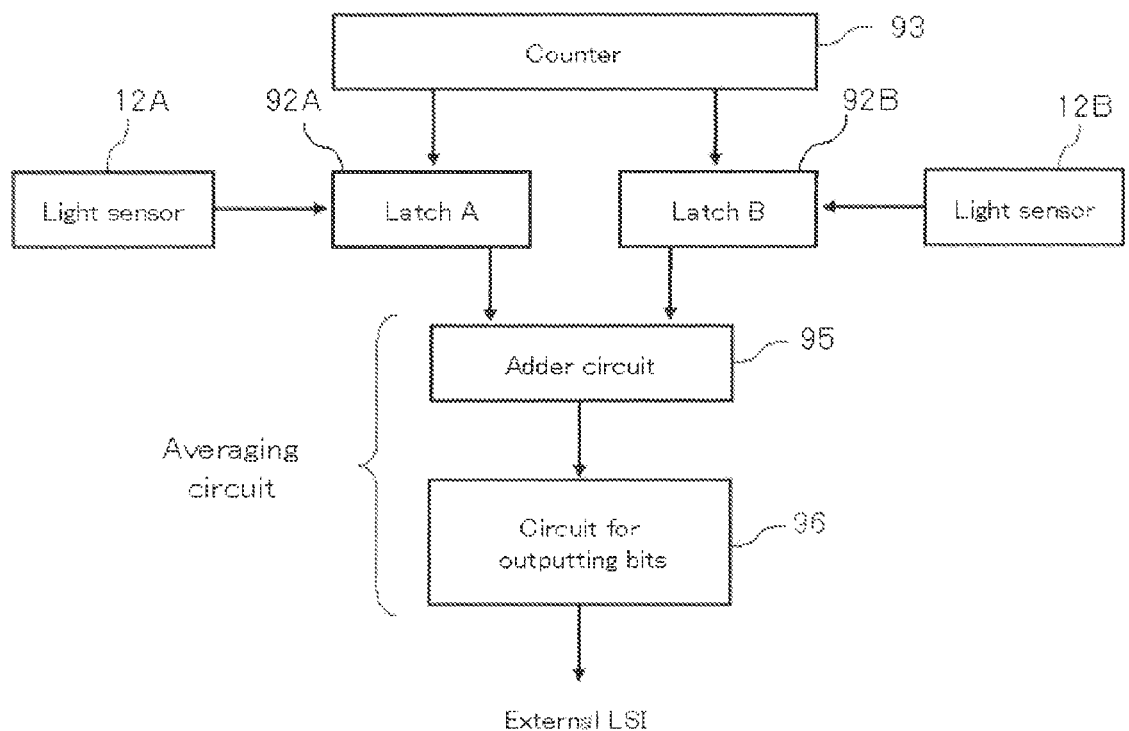
FIG. 22 is a diagram showing another example of the configuration of the circuit in FIG. 18 added with filtering means.

Also, this embodiment is provided with a filtering circuit (filtering means) as a countermeasure for coping with flicker of an illuminator. FIG. 21 has the circuit of FIG. 18 added with an averaging circuit comprising an adder circuit 95 and a circuit 96 for outputting significant bits. The adder circuit 95 adds to latch values over plural times. The significant bits output over plural times from the circuit 96 can be averaged. The averaged signal is output to the external LSI 10. Otherwise, as shown in FIG. 22, may be adopted the procedure comprising inputting the output of the light sensor 12A to a latch A 92A and, at the same time, inputting the output of the light sensor 12B to a latch B 92B, and then averaging the outputs from the two latches using an adder circuit 95 and a circuit 96 for outputting significant bits, and finally transmitting the averaged signal to the external LSI 10.

The present invention is not limited to the embodiments described above, but can variously be modified within a range not departing from the gist of the present invention.

As described above, the first embodiment has the sensor 12 for measuring the outside illuminance and a temperature sensor 13 installed on the array substrate 2 and the second and third embodiments has the sensor 12 for measuring the outside illuminance installed on the array substrate 2. In the liquid crystal display device in each of the embodiments, the array substrate 2 may be provided thereon with second and third light sensor, for example, in addition to the light sensor 12 for measuring the outside illuminance.

Figure 23:
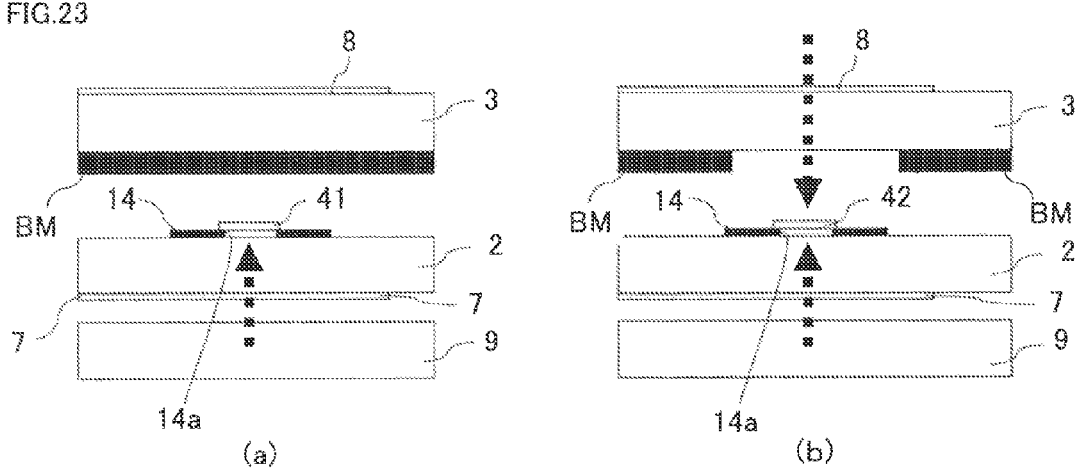
FIG. 23A is a schematic enlarged view showing a state of a light sensor for measuring the illuminance of a backlight and FIG. 23B is showing a light sensor for measuring whole illuminance.

FIG. 23 shows one example provided with the second and third light sensors. As the second light sensor, for example, as shown in FIG. 23A, a light sensor 41 for measuring the illuminance of the backlight can be cited, which is provided for the purpose of monitoring the illuminance of the backlight 9. As shown in FIG. 23C, the light-shielding layer 14 under the backlight illuminance-measuring light sensor 41 is formed therein with an opening 14a for taking in the light of the backlight 9. In place of the provision of the opening 14a, the light-shielding layer 14 can be omitted. Since the black matrix BM on the side of the opposed substrate 3 is provided with no opening, there is no case where the backlight illuminance-measuring light sensor 41 is irradiated directly with the outside light. Incidentally, the light from the backlight 9 is directly incident on the backlight illuminance-measuring light sensor 41 disposed in the vicinity of the backlight 9 and, since the incident light intensity is higher than that of the outside light, the light-receiving area of the backlight illuminance-measuring light sensor 41 is smaller than that of the outside illuminance-measuring light sensor 12, preferably 1/P (P>1), for example.

FIG. 23B shows the configuration of the third light sensor. As the third light sensor, for example, a whole illuminance-measuring sensor 42 for measuring the entire light (outside light and backlight light) can be cited. In the whole illuminance-measuring sensor 42, the black matrix BM on the side of the opposed substrate 3 is formed with an opening 11 to enable the outside light to be taken in and, at the same time, the light-shielding layer 14 under the whole illuminance-measuring sensor 42 is formed with an opening 14a for taking in the light from the backlight 9. Incidentally, also in this case, in place of the formation of the opening 14a it is made possible to omit the light-shielding layer 14.

The provision of the light sensor 41 for measuring the illuminance of the backlight or the sensor 42 for measuring the whole illuminance makes it possible to compute the outside illuminance with the light sensor 12 for measuring the outside illuminance using the outputs of the sensors 41 and 42 as the standards and to utilize the grasped the illuminance fluctuation of the backlight in adjusting the amount of light of the backlight 9.

Figure 24:
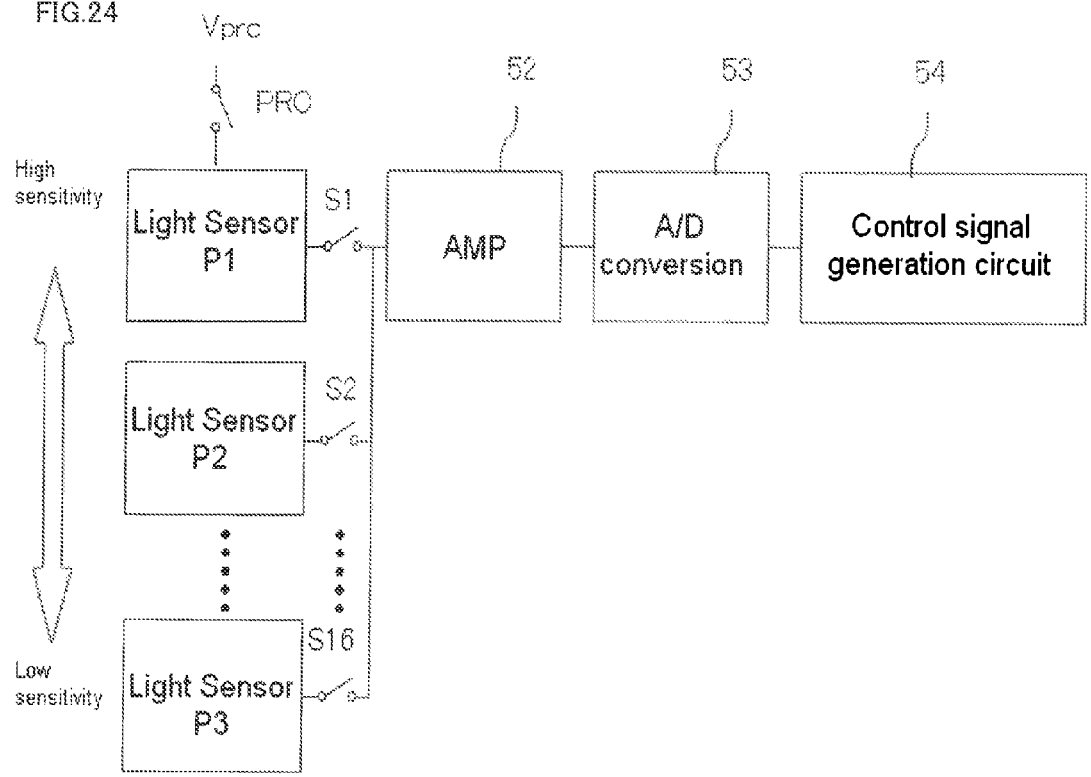
FIG. 24 is a circuit diagram showing one example of a circuit provided with plural light sensors different in sensitivity.
Figure 25:
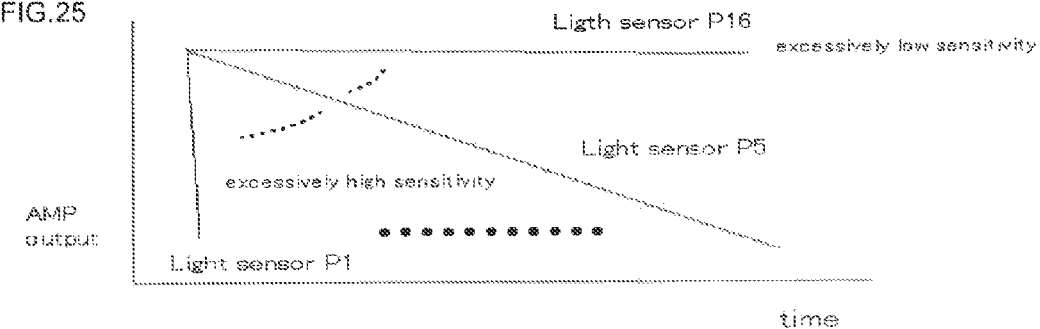
FIG. 25 is a graph showing the change of an amplifier output with time in each of plural light sensors different in sensitivity.

In addition, while the number of the light sensors 12 for measuring the outside illuminance may be one at minimum, plural light sensors 12 for measuring the outside illuminance having different light-receiving areas may be provided to make it possible to measure the outside illuminance, with the light sensors 12 switched depending on the degree of the outside illuminance To be specific, as shown in FIG. 24, for example, 16 light sensors P1, P2, ..., P16 of different sensitivities are provided as the sensors for measuring the outside illuminance. Here, the light sensor P1 has a highest sensitivity and the light sensor P16 has a lowest sensitivity, with the light sensors P2 to P15 varied gradually in sensitivity. In the case of thus providing plural light sensors of different sensitivities, as shown in FIG. 25, for example, even when it is impossible to correctly measure the outside illuminance because the output of the light sensor P1 has an excessively high sensitivity and because the output of the light sensor P16 has an excessively low sensitivity, if the sensitivity of an intermediate light sensor, e.g. the light sensor P5, is appropriate, the output thereof is used to enable the outside illuminance to be correctly measured.

Figure 26:
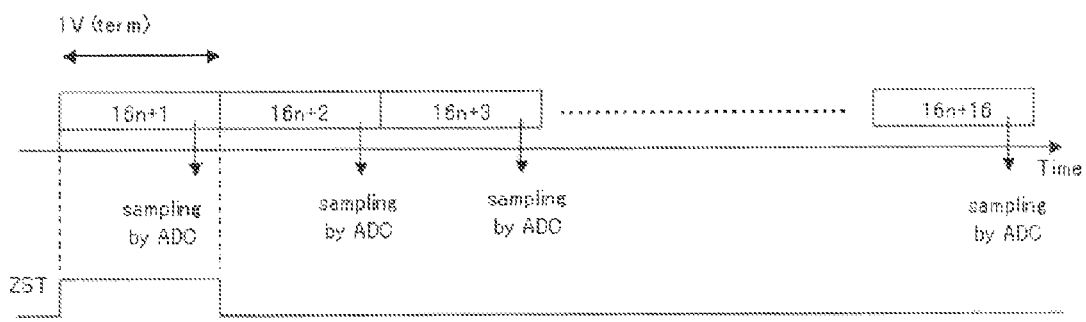
FIG. 26 is a diagram showing the time sequence when taking out outputs from plural light sensors.
Figure 27:
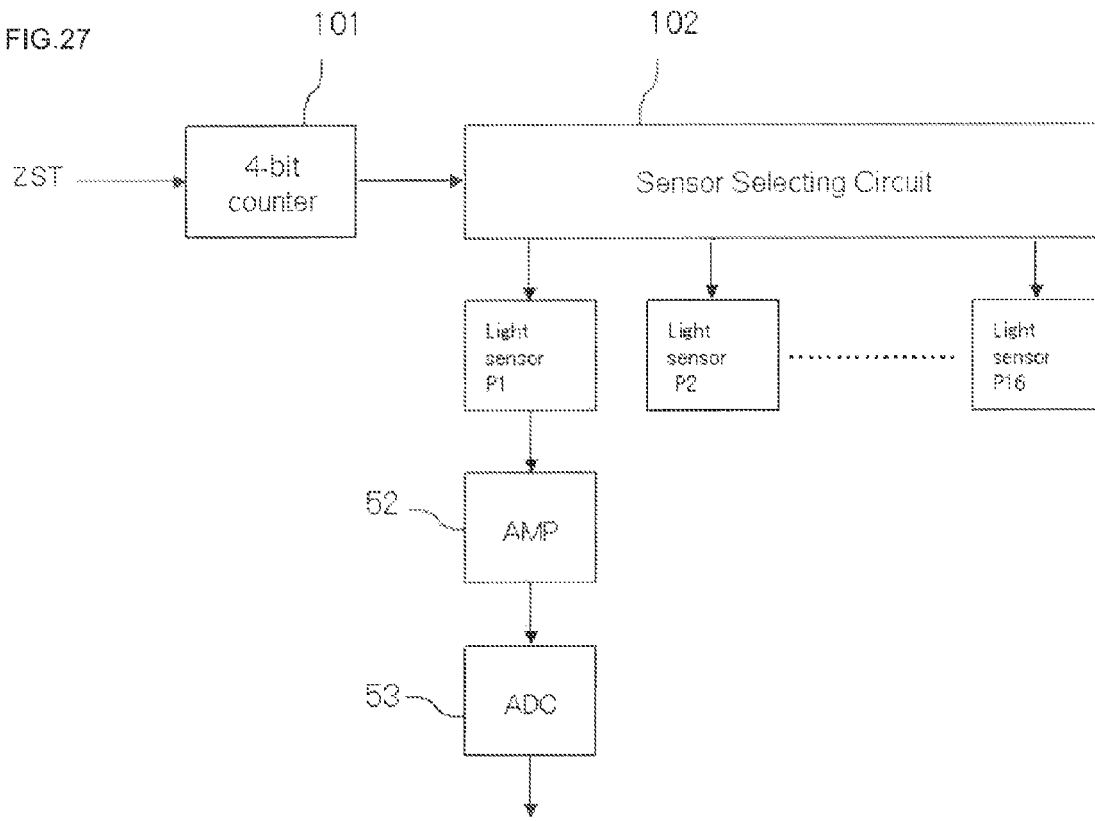
FIG. 27 is a diagram showing one example of a circuit provided on an array substrate when taking out outputs from plural light sensors.

FIG. 26 and FIG. 27 show a concrete example for taking out outputs of plural light sensors. FIG. 26 shows a time sequence. Sixteen light sensors output their outputs in order from a start frame in which a signal ZST for prescribing a frame that performs a read operation has reached a high level over 16 frames in total. FIG. 27 shows an example of the circuit to be provided on an array substrate. On the array substrate, a 4-bit counter 101 and a sensor selecting circuit 102 are provided. The signal ZST is input to the 4-bit counter 101 and, as a result, one count increment is attained per frame. Any one of the 16 light sensors P1 to P16 is selected based on the 16 outputs of the 4-bit counter 101. In the frame, the output of the selected light sensor is supplied to the outside and subjected to illuminance calculation. In the outside, the outputs of the 16 light sensors are accumulated, and a prescribed calculation is performed to determine a proper illuminance value. The signal ZST is issued at a CPU and supplied onto the array substrate via a driver IC. The counter may comprise a 16-stage shift register row. The procedure of inputting the signal ZST at the initial stage, sending a shift pulse to a next stage every one term of one frame may be adopted. Otherwise, as another method requiring no signal ZST, the sensor selecting circuit 102 may be configured such that the 4-bit counter 101 is reset at the time of introducing a power supply, that the number of the frames is then counted entirely and that a relevant light sensor is always output based on the state of the 4-bit counter 101. Adopting this is at an advantage in no necessity to supply the signal ZST from the outside.

Figure 28:
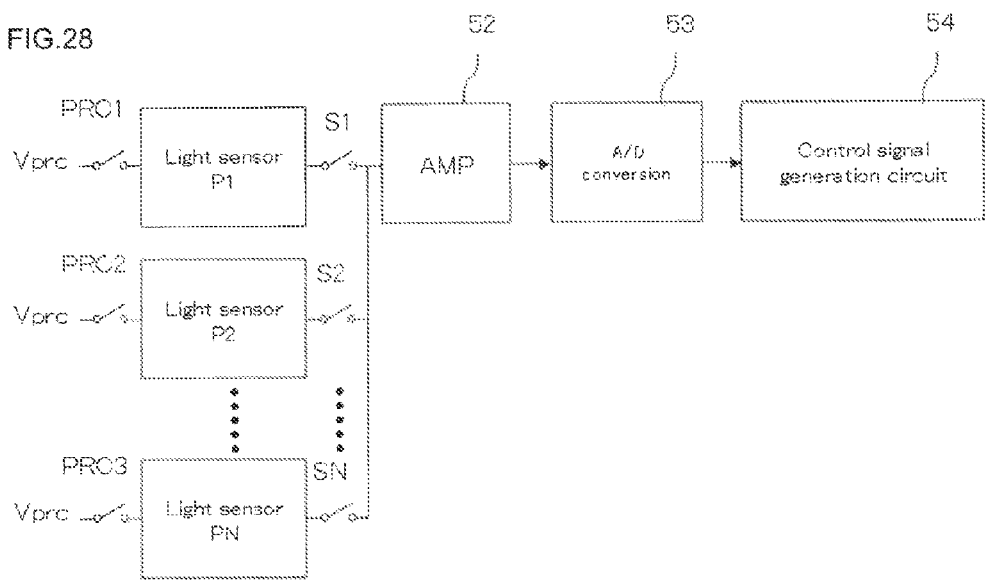
FIG. 28 is a diagram showing one example of a configuration for smoothening local variations in light sensors.
Figure 29:
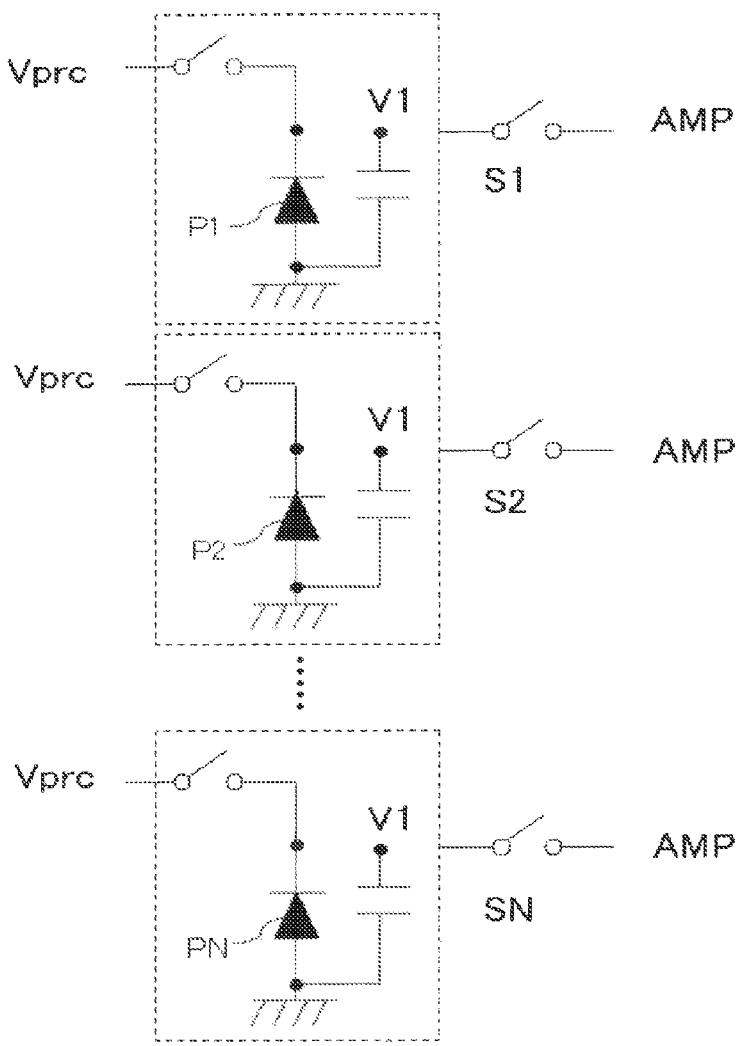
FIG. 29 is a circuit diagram of each light sensor in the configuration for smoothening local variations in light sensors.
Figure 30:
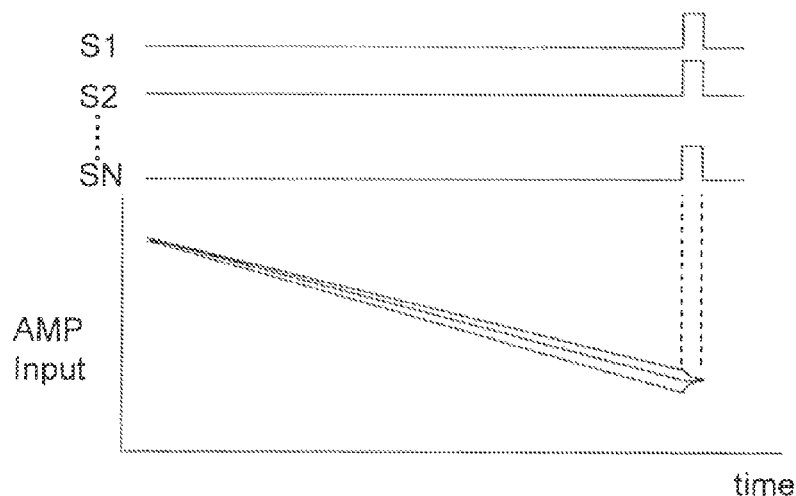
FIG. 30 is a graph showing how the local variation of each light sensor is smoothened.

The light sensor 12 formed on the array substrate for measuring the outside light also has variation locally. The local variation constitutes a cause of a calculation disorder. A countermeasure for coping with this is illustrated in FIG. 28 to FIG. 30. FIG. 28 and FIG. 29 show an example of the configuration for smoothing the local variation of the light sensor. In this example, N number of light sensors P1 to PN having the same sensitivity are simultaneously pre-charged and simultaneously exposed to the outside light. By short-circuiting the light sensors P1 to PN one another during a sampling operation relative to an amplifier 52, even when their characteristics (outputs S1 to SN) vary locally, as shown FIG. 30, the local variation is averaged, output from the amplifier and A/D converted. From the treatment for calculating the illuminance as described above, it is made possible to calculate the illuminance with higher precision.

That is to say, assuming that capacitor voltages immediately before the sampling operation relative to the amplifier 52 are denoted by $V_1, V_2, \ldots, V_N$, an amplifier input voltage $V_{in}$ after short-circuiting the switches S1, S2, . . . , SN is represented by the formula below, resulting in the calculation of an average value. Conceivably, this calculation can be weighed and subjected to other operations. By outputting the result alone obtained through the calculation on the array substrate, as described above, a merit lies in making the number of output pins smaller than in the case where the values of the N number of light sensors are output.

$$V_{in} = \frac{V_1 + V_2 + \ldots + V_N}{N}$$

Furthermore, it is made possible to provide the black matrix BM facing the outside illuminance-measuring light sensor 12 in the opening 11 thereof with a color filter. A problem encountered when providing the array substrate 2 with the outside illuminance-measuring light sensor 12 and adjusting the brightness of the backlight using the output from the light sensor 12 is that the sensitivity of the light sensor 12 to the wavelength of light does not always conform to the wavelength characteristic of the human's eyes. This problem further poses a problem in that in the case of high light intensity in an infrared or ultraviolet region, for example, the output from the light sensor 12 having sensed the infrared rays looks as if it is bright in spite of the dark circumference for the human's eyes. When there is in a dark room a heating appliance emitting infrared rays, for example, the outside illuminance-measuring light sensor 12 having sensed the infrared rays generates a large output to produce a malfunction of making the light of the backlight brighter than necessary. By forming a color filter at the place where the light sensor is disposed, therefore, infrared or ultraviolet light can be attenuated to allow the light having a wavelength sensitive to the human's eyes to enter the photosensor, thereby enabling a solution to this problem.

When forming the color filter, since the human's eyes have a peak of sensitivity to a green color, it is desirable that a green color filter be formed. In addition, while ultraviolet light is permeable to a blue color filter, since a polarization plate generally used for a liquid crystal display device is provided with a filter for ultraviolet light, use of the blue color filter can also attain the above object. Furthermore, while a color filter of three additive primary colors is used here, using a color filter of subtractive color mixing brings about substantially the same effects. In this case, a cyan color is appropriate.

Figure 31:
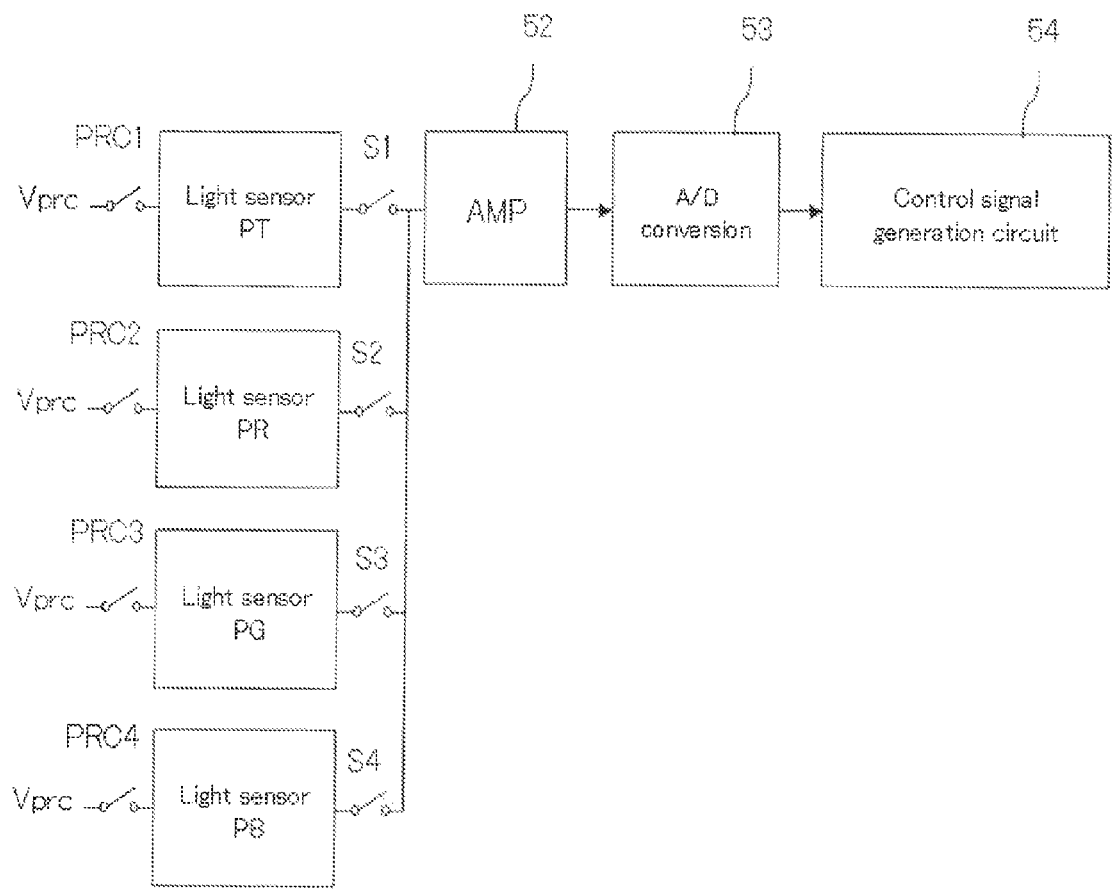
FIG. 31 is a circuit diagram showing one example of a circuit provided with plural light sensors provided with various color filters.

When forming the color filter, as shown in FIG. 31, by forming light sensors PT provided with no color filter, light sensors PR provided with a red color filter, light sensors PG provided with a green color filter and light sensors PB provided with a blue color filter at prescribed ratios and short-circuiting these light sensors one another before the sampling operation relative to the amplifier, it is made possible to freely set a correction suitable for an application of a display (environment light capable of being exposed). There can be adopted a modified example that forms light sensors PT provided with no color filter, light sensors PR provided with a red color filter, light sensors PG provided with a green color filter and light sensors PB provided with a blue color filter at uniform ratios, hastens to transfer all outputs of these light sensors and subjects the transferred outputs to averaging treatment while being weighed. Incidentally, it is possible to form these color filters simultaneously with a color filter in the display region.

Figure 32:
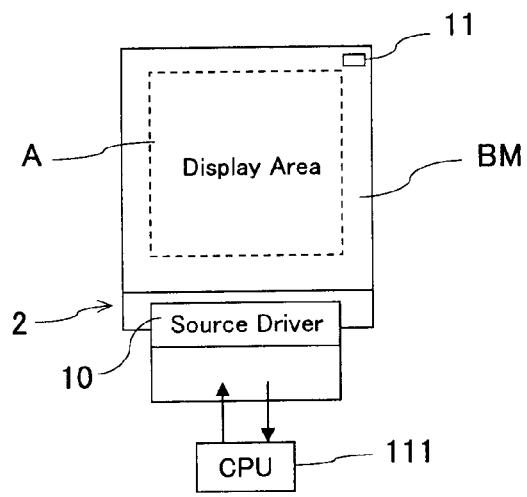
FIG. 32 is a plan view showing the schematic configuration of a display device suitable for achieving simultaneous pursuit of a narrow frame and precise light adjustment.
Figure 33:
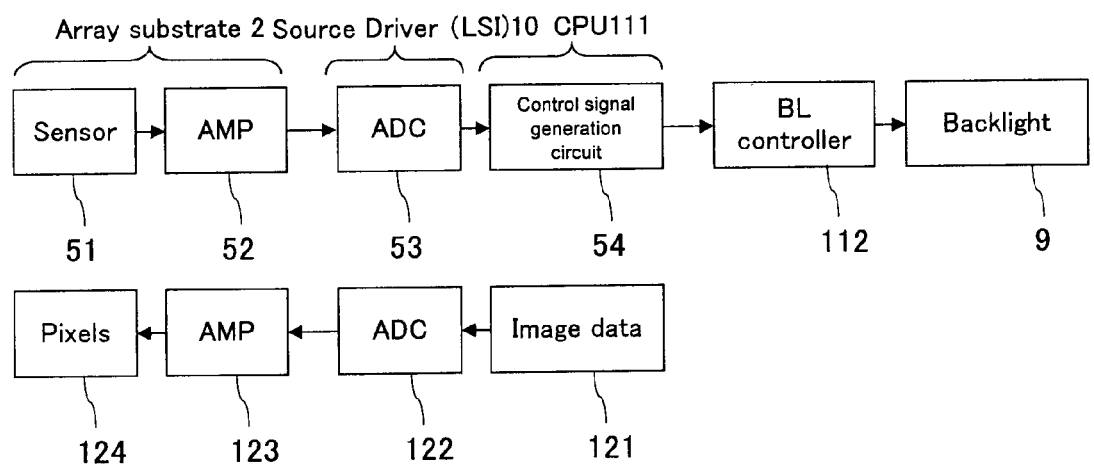
FIG. 33 is a diagram showing the configuration of a system suitable for achieving simultaneous pursuit of a narrow frame and precise light adjustment.

FIG. 32 and FIG. 33 show a system configuration particularly suitable for allowing a frame to be compatible with high-precision light adjustment in a display device (liquid crystal cell, for example). In this configuration, an A/D conversion circuit 53 is incorporated into an LSI 10, and a control signal generation circuit 54 is incorporated into a CPU 111 provided outside. In addition, an output of the control signal generation circuit 54 is input to a backlight controller 112 to control the amount of light of the backlight. An image is displayed through the steps of sending image date 121 from the CPU 111 to an A/D conversion circuit 122 of the LSI 10 and driving a switching device (TFT) for pixels 124 via an amplifier 123.

In this configuration, no A/D conversion circuit 53 is formed on the array substrate 2. This is because a circuit on the array substrate 2 is inferior in transistor property to a circuit formed on a silicon wafer to induce a larger error. It is more advantageous in precision when the output of the amplifier 52 on the array substrate 2 is digitalized with the A/D conversion circuit 53 installed inside a source driver (LSI 10) than when the output is digitalized on the array substrate 2. It is better not to make complicated calculation using the source driver. In order for the source driver to make complicated calculation, the source driver has to be provided with logic circuit, resulting in an increase in area of the source driver and eventually in an increase in area of the lower side frame of the liquid crystal display cell. Since the CPU 111 executes makes a minutest process within the system, execution of complicated illuminance calculation by the CPU has a small effect on a set contour. Incidentally, the CPU may be provided with a temperature sensor, which can be utilized for correction.

Moreover, the liquid crystal display device according to the second or third embodiment may be provided, besides the light sensor, with a temperature sensor for measuring the temperature around the light sensor, similarly to that according to the first embodiment. In this case, it may be adopted that the value measured by the light sensor is corrected based on the output from the temperature sensor and that the configuration of the temperature sensor and method for correcting the temperature are the same as those in the first embodiment.

While the liquid crystal display device has been described above as examples of the present invention, the present invention is effective for a light-emitting display device, such as an organic EL display etc. Detecting the outside light to control the emission luminance of an organic EL device is effective for low power consumption at dark places or improvement in visual discernibility at bright places

What is claimed is:

1. A display device having a predetermined display region, comprising:
    an array substrate;
    a drive circuit;
    a plurality of light sensors provided on the array substrate and configured to measure outside illuminance;
    a temperature sensor provided on the array substrate; and
    an integrated-circuit element provided on the array substrate and configured to process a signal output from the plurality of light sensors, the integrated-circuit element further configured to compensate the signal output from the plurality of light sensors based on an output signal of the temperature sensor.

2. A display device according to claim 1, wherein the temperature sensor is provided with a resistor element formed as a temperature-sensitive element using polysilicon.

3. A display device according to claim 2, wherein the polysilicon constituting the resistor element is implanted with impurities.

4. A display device according to claim 3, wherein the polysilicon constituting the resistor element is of an n-conductive type in consequence of being implanted with the impurities.

5. A display device according to claim 2, wherein the resistor element has a capacitor element connected thereto to constitute a temperature sensor circuit having two terminals, to one of which precharge voltage is applied at a predetermined cycle to detect temperature based on a change in voltage in a predetermined time.

6. A display device according to claim 1, wherein the signal output from the plurality of light sensors and the signal output from the temperature sensor are converted into digital signals, respectively, with A/D conversion circuits and input to the integrated-circuit element via the A/D conversion circuits.

7. A display device having a predetermined display region, comprising:
    an array substrate including a drive circuit configured to drive a plurality of pixel TFTs;
    a plurality of light sensors installed on the array substrate and configured to measure outside illuminance;
    filtering means for filtering a signal output from the plurality of light sensors; and
    a processing circuit configured to process the signal output from the plurality of light sensors that was filtered with the filtering means, wherein
    the filtering means includes a latch circuitry configured to latch counter values based on at least one trigger signal output from the plurality of light sensors, an adder circuit provided on the latch circuitry and configured to add the counter values, and an output circuit configured to serially output the significant bits, excluding the least significant bit, from the results of the addition.

8. A display device according to claim 7, wherein the filtering means further comprises a trigger switch circuit, and the latch circuitry comprises plural latch circuitries.

9. A display device according to claim 7, wherein the signal output from the plurality of light sensors different in exposure time, and the filtering means is a circuit for averaging signals corresponding to respective reaction times of the plurality of light sensors.

10. A display device according to claim 9, wherein the latch circuitry comprises plural latch circuitries corresponding in number to the plural light sensors.

* * * * *